US007181494B2

(12) United States Patent
Lavoie et al.

(10) Patent No.: US 7,181,494 B2
(45) Date of Patent: Feb. 20, 2007

(54) COMPARING THE POSITION OF SHARED OBJECTS

(75) Inventors: Martin Lavoie, Longueuile (CA); Carl Dionne, Montreal (CA)

(73) Assignee: Quazal Technologies Inc., Montreal (CA)

( * ) Notice: Subject to any disclaimer, the term of this patent is extended or adjusted under 35 U.S.C. 154(b) by 574 days.

(21) Appl. No.: 09/829,003

(22) Filed: Apr. 10, 2001

(65) Prior Publication Data

US 2002/0143781 A1    Oct. 3, 2002

(51) Int. Cl.
G06F 15/16 (2006.01)
G06F 15/173 (2006.01)
A63F 9/24 (2006.01)

(52) U.S. Cl. .................. 709/205; 709/226; 463/32; 463/42

(58) Field of Classification Search ............... 709/203, 709/205, 226; 463/32, 42
See application file for complete search history.

(56) References Cited

U.S. PATENT DOCUMENTS

| 5,623,642 A * | 4/1997 | Katz et al. ............... 703/7 |
| 5,772,512 A | 6/1998 | Chichester |
| 5,838,909 A | 11/1998 | Roy et al. |
| 5,879,236 A | 3/1999 | Lambright |
| 5,950,202 A | 9/1999 | Durward et al. |
| 6,042,477 A * | 3/2000 | Addink ................. 463/42 |
| 6,057,856 A | 5/2000 | Miyashita et al. |
| 6,126,548 A * | 10/2000 | Jacobs et al. .......... 463/42 |
| 6,701,316 B1 * | 3/2004 | Li et al. ................ 707/10 |

FOREIGN PATENT DOCUMENTS

| EP | 0753835 A2 | 1/1997 |
| EP | 0930755 A1 | 7/1999 |
| WO | WO 97/43846 | 11/1997 |

OTHER PUBLICATIONS

UK Search Report.
van Hook et al, "Approaches to Relevance Filtering", In Eleventrh Workshop on Standards for the Interoperability of Distributed Simulations, 1994.
van Hook et al, "Approaches to TRI Implementation of HLA Data Distribution Management Services", in Proceedings of the 15th Workshop on Standards for the Interoperability of Distributed Simulations, 1996.
Petty et al, "Experimental Comparison of d-Rectangle Intersection Algorithms Applied to HLA Data Distribution", In Proceedings of the 1997 Fall Simulation Interoperability Workshop, 1997, 97F-SIW-016.
Singhal et al, "Using a Position History-Based Protocol for Distributed Object Visualization", In Designing Real-Time Graphics for Entertainment [Course Notes for SIGGRAPH '94 Course No. 14], Jul. 1994.

(Continued)

*Primary Examiner*—Jason Cardone
*Assistant Examiner*—Tanim Hossain
(74) *Attorney, Agent, or Firm*—Nixon & Vanderhye P.C.

(57) ABSTRACT

The present invention provides a computer network configured to define and update data structures within a shared computer-generated environment, wherein a local instantiation 1001 of one of said data structures is known as a duplicate master 805 and updates remote instantiations 1004 of said data structure known as duplicas 804 according to distance-based Position History-Based Dead Reckoning 906. Said updating operation 906 according to distance-based PHBDR minimises the amount of data 1402 transmitted for the purpose thereof and the quality factor 1601 implemented according to an improved embodiment of the present invention dynamically maximises (1501, 1502, 1503) the usage made of the network bandwidth 702 available at any time.

24 Claims, 18 Drawing Sheets

OTHER PUBLICATIONS

Singhal et al, "Networked Virtual Environments—Design and Implementation", ACM Press Books, SIGGRAPH Series, Jul. 1999.

Craymer et al, "A Scalable, RTI-Compatible Interest Manager for Parallel Processors" In Proceedings of the 1997 Spring Simulation Interoperability Workshop, 1997, 97S-SIW-154.

Singhal, Effective Remote Modeling in Large-Scale Distributed Simulation and Visualization Environments, PhD Thesis, Stanford University, 1996.

* cited by examiner $$1301 \quad E = \left[ \sum_{i=1}^{n} (x_i - x'_i)^2 \right]^{\frac{1}{2}}$$

E = extrapolation error for x data
x = actual value of variable x at local terminal
x = extrapolated value of variable x at remote terminal $$1302 \quad Z = \left[ \sum_{i=1}^{n} (x'_{Duplica} - x'_{Observer})^2 \right]^{\frac{1}{2}}$$

Z = distance between the observer and the duplica
x = actual value of variable x at local terminal
x' = extrapolated value of variable x at remote terminal

1303

$$T = dConstant + (dLinear \times Z) + (dQuadratic \times Z^2)$$

T = error tolerance
Z = distance between the observer and the duplica
dConstant = parameter for absolute minimum error tolerance
dLinear = coefficient for linear relationship between Z and T
dQuadratic = coefficient for quadratic relationship between Z and T

*Figure 13*

$$T = dConstant + \left[dLinear \times \left(\frac{Z}{Q}\right)\right] + \left[dQuadratic \times \left(\frac{Z}{Q}\right)^2\right]$$

T = error tolerance
Z = distance between the observer and the duplica
dConstant = parameter for absolute minimum error tolerance
dLinear = coefficient for linear relationship between Z and T
dQuadratic = coefficient for quadratic relationship between Z and T
Q = quality factor

*Figure 16*

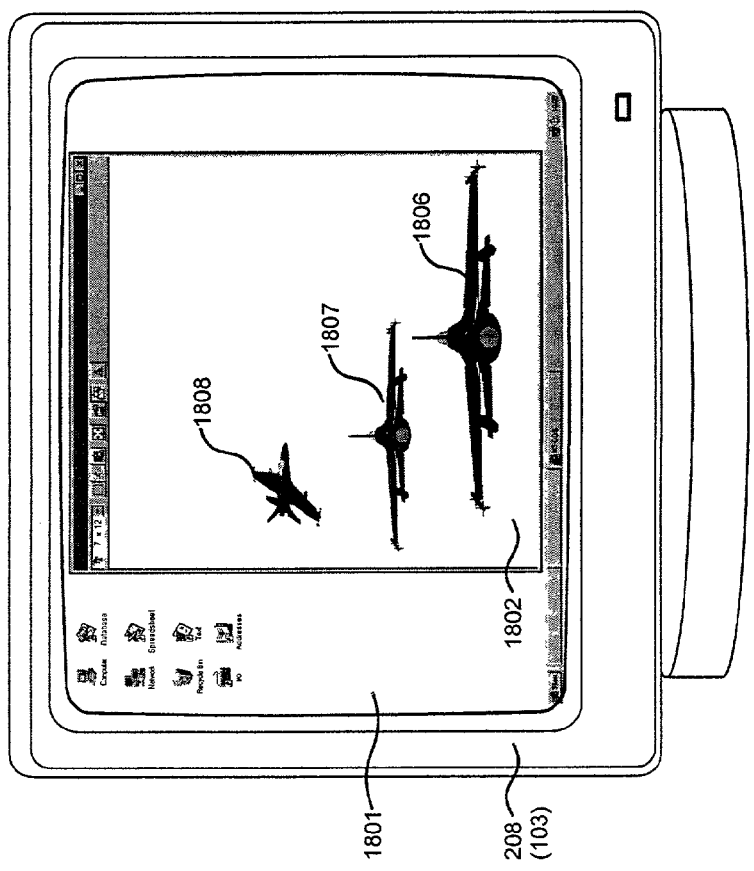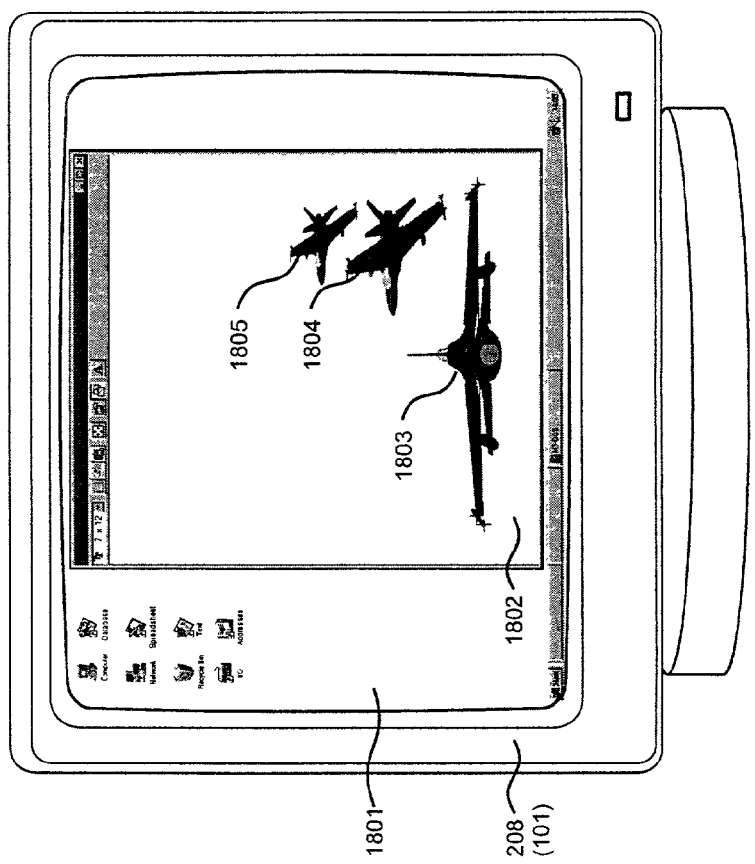
Figure 18

COMPARING THE POSITION OF SHARED OBJECTS

BACKGROUND OF THE INVENTION

1. Field of the Invention

The present invention relates to a method of defining and updating data structures equipped with data which is preferably continuous, within a shared computer-generated environment.

2. Description of the Related Art

Methods are known to define and update data structures, also known as objects, within shared computer-generated environments. Said objects are traditionally shared between network connected user terminals over a network such as the Internet, with said sharing usually coordinated by one or a plurality of central servers. An example of objects defined and shared within a computer-generated environment is provided by professional and recreational computer-based simulations, wherein users individually control computer-generated vehicles, such as aeroplanes and the like, within a computer-generated battle field defined and updated by one or a plurality of central servers, such that said users can interact with one another by means of their respective vehicles.

In order for the interaction to be immersive, i.e. provide a user with accurate information for every vehicle within the virtual battlefield, all of the attributes of all of the vehicles, such as their respective position, must be updated on all of the participating user terminals as often as possible, such that any particular user can exercise appropriate control of their vehicle relatively to the respective states of other vehicles controlled by other users. To achieve this, said servers traditionally broadcast the situation of every vehicle within the battle field to all of the participants by means of packets of data which define a complete instantiation of said every vehicle in said battle field.

However, it is known that for shared computer-generated environments involving hundreds and potentially thousands of participants, the above prior art is most inappropriate as network bandwidth according to the known art precludes updates of the magnitude required for updating said thousands of participants in a timely fashion, which is of the order of hundreds of milliseconds. Furthermore, said network bandwidth is known to fluctuate importantly in open networks such as the Internet, and thus further constricts the speed at which every user terminal participating in a networked application of the type described above can be updated.

A known method of overcoming the above limitations was proposed by Sandeep Kishan Singhal's in his dissertation "Effective Remote Modeling in Large Scale Distributed Simulation and Visualisation Environments", dated August 1996, with the disclosure of a position history-based dead reckoning (PHBDR) extrapolation algorithm, by means of the implementation of which only continuous data with which a shared object is equipped, such as positional data, requires updating over the network. The implementation of PHBDR reduces the size of the packets of data broadcasted for updating purposes to all of the participants in a networked computer-generated simulation and thus improves the updating frequency. However, the implementation of PHBDR according to the prior art still does not preclude the updating of a networked simulation, or other type of similarly immersive networked application, from being disrupted in the case of networks afflicted with important bandwidth fluctuation, such as the Internet. In instances where the bandwidth fluctuates beyond the minimum amount required for PHBDR-based updates according to the prior art, a severe degradation of the updating information known to those skilled in the art as 'packet loss' occurs such that the shared objects present within a computer-generated environment simply cease being updated and the local rendering of said objects becomes inaccurate until such time as said bandwidth returns to an optimal value, thereby affecting users' decision-making in the course of their interactions.

BRIEF SUMMARY OF THE INVENTION

According to a first aspect of the present invention, there is provided a computer network configured to define and update data structures within a shared computer-generated environment, comprising a plurality of user-computer terminals having display means, storage means, processing means and network connection means, wherein said storage means stores said data structures and program instructions; said processing means is configurable by said program instructions to perform the steps of equipping a first of said data structures with continuous data at a first of said user-computer terminals; at a second of said user-computer terminals, predicting said continuous data of said first data structure; comparing said predicted continuous data with continuous data of a second of said data structures stored at said second user-computer terminals; and updating said first data structures at said second user-computer terminal in response to said comparison.

According to a second aspect of the present invention, there is provided a method of updating data structures within a computer-generated environment shared between users connected via computer terminals connected to a network, wherein a user's computer terminal performs the steps of equipping a data structure with continuous data; predicting said continuous data of said data structure; comparing said predicted continuous data with continuous data of a second data structure stored at a second user-computer terminal; and updating said data structure in response to said comparison.

BRIEF DESCRIPTION OF THE SEVERAL VIEWS OF THE DRAWINGS

FIG. 13 details the method of deriving distance between duplicated objects, including an observer, according to the invention;

FIG. 16 details the method of deriving distance between duplicated objects, including an observer, according to an improved embodiment of the invention;

FIG. 18 provides a graphical representation of the Graphical User Interface displayed by the respective Video Display Units of any two of the three user terminals shown in FIG. 11;

BEST MODE FOR CARRYING OUT THE INVENTION

The invention will now be described by way of example only with reference to the previously identified drawings.

Applications such as simulations traditionally feature a plurality of vehicle objects comprising data, such as planes or soldiers, each of which is known to those skilled in the art as an 'entity' and is usually controlled by a user by means of a networked computer terminal. Local user input equips a local object with continuous data, such as positional data, or non-continuous data, such as event data, and said local object then interacts with other user-controlled objects within a computer-generated environment, such as a battlefield, as it is distributed to remote computer terminals by a coordinating server. Said simulation thus distributes each of said user-controlled object to all of the other users logged onto the network and partaking in the multi-user simulation application. An environment for connecting multiple users to whom data will be distributed is illustrated in FIG. 1.

FIG. 1

Computer terminals 101 and 102 and server 103 are respectively connected via internet service providers (ISP) 104, 105 and 106 to the Internet 107. The ISP's 104 to 106 in combination with computer terminals 101, 102 and server 103 provide each individual user with a unique IP address, e-mail account and other optional internet facilities such as are commonly provided to a user with an ISP account. Provided that appropriate data transfer applications, protocols and permissions have been set up, there is provided the scope for any one of computer terminals 101 and 102 to access and receive data stored on server 103.

Figure 1:
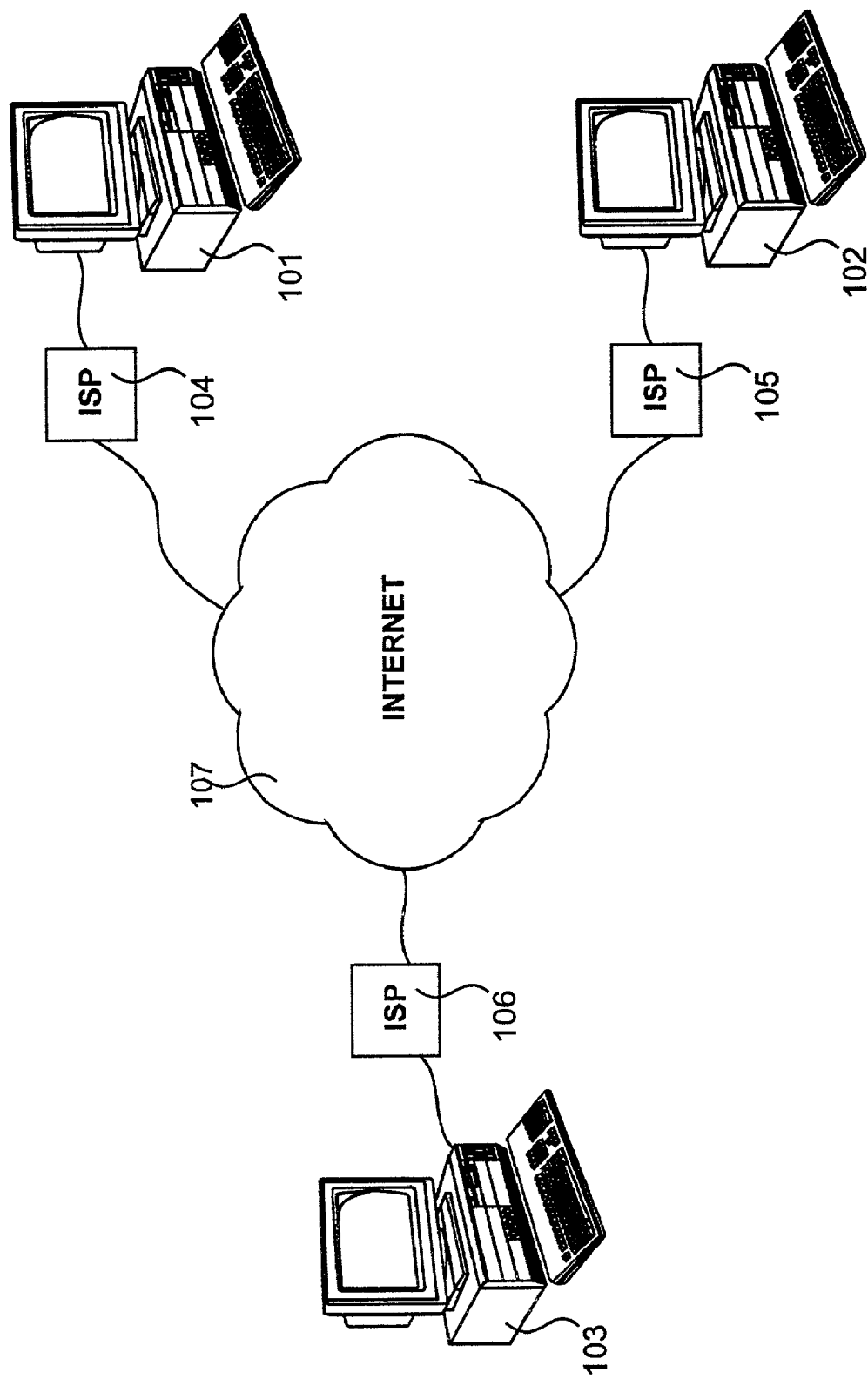
FIG. 1 illustrates a network environment, including user terminals sharing data over said network environment.
Figure 2:
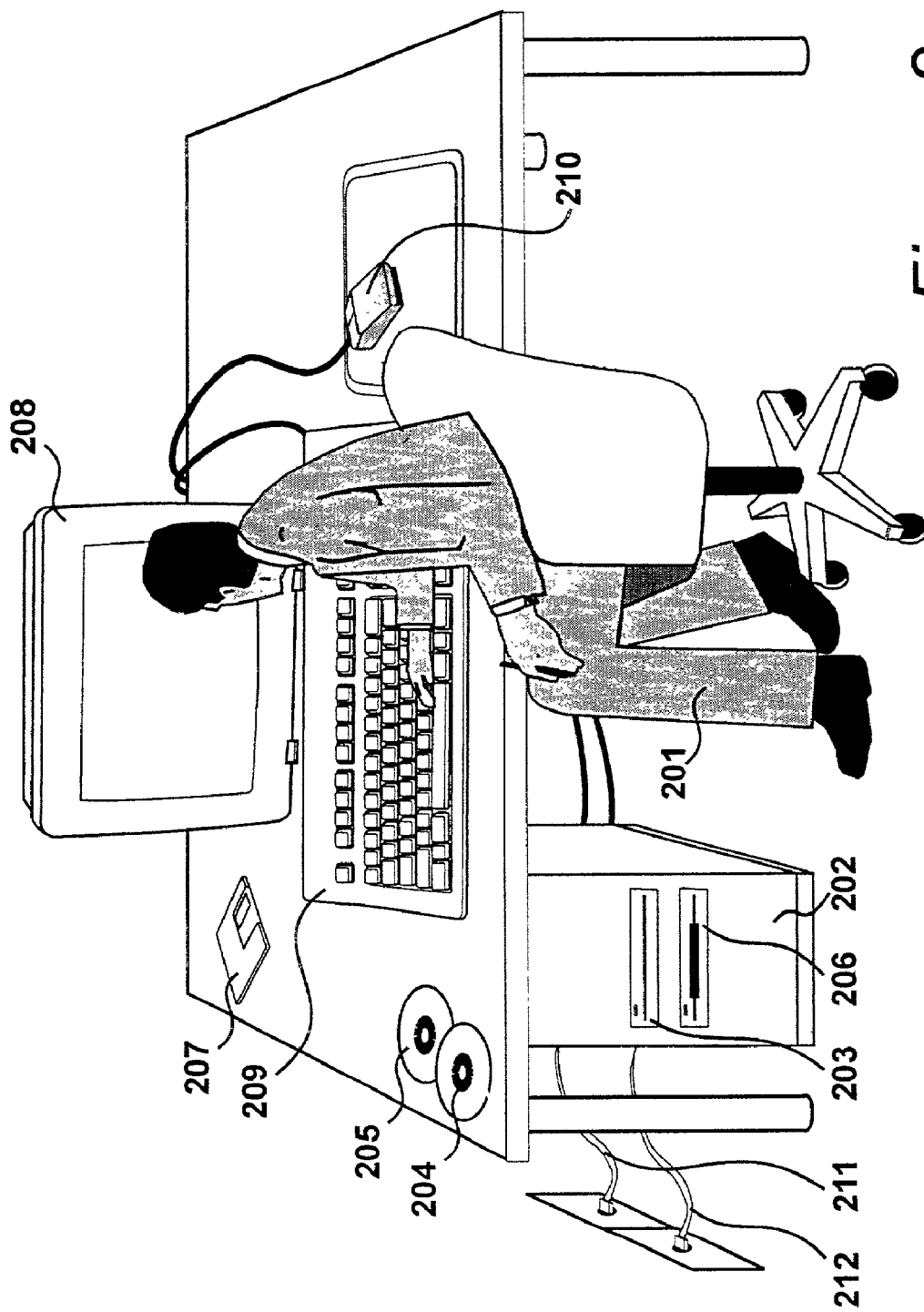
FIG. 2 shows a user terminal for sharing data shown in FIG. 1.

A computer terminal for controlling shared objects and receiving updating data thereof within a computer-generated environment maintained over the network shown in FIG. 1 is shown in FIG. 2.

FIG. 2

A user 201, is shown who primarily uses a computer terminal 202, having a drive 203 for receiving CD-ROMS 204 and writing to CD-RAMS 205 and a drive 206, for receiving high capacity magnetic disks such as zip disks 207. According to the present invention, computer 202 may receive program instructions such as a simulation application via an appropriate CD-ROM 204 or data relating to the simulation experience may be written to a re-writable CD-RAM 205 and said data may be received from or written to a zip disk 207 by means of drive 206. The computer-generated environment, the local objects and remote shared objects are displayed on a visual display unit 208 and manual input is received from user 201 via a keyboard 209 and a mouse 210. Data may also be transmitted and received over a local area network 211, or the Internet 107 by means of modem connection 212.

Figure 3:
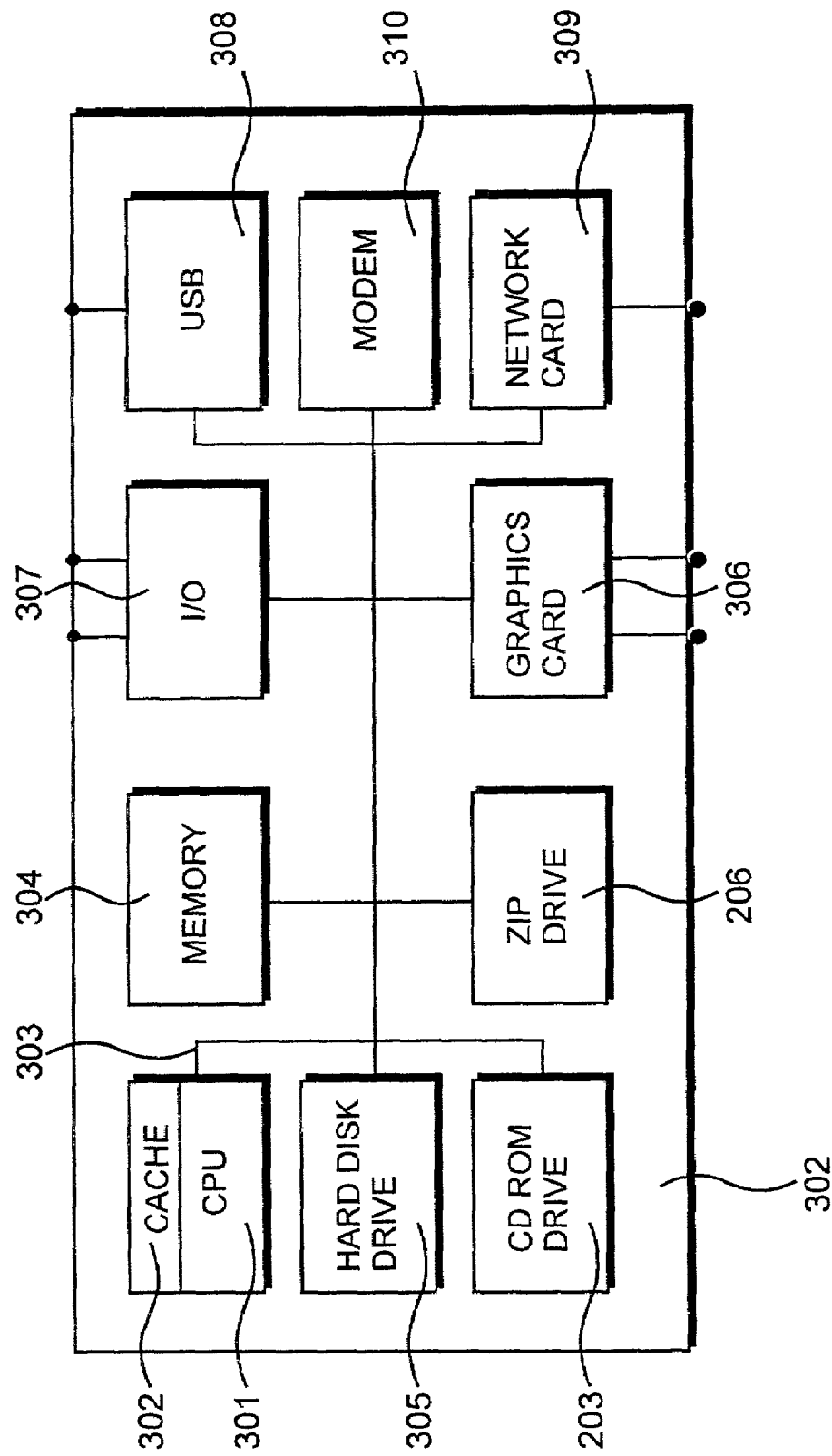
FIG. 3 details hardware components of the user terminal shown in FIG. 2, including a memory.

The typical components of computer terminal 202 shown in FIG. 2 are detailed in FIG. 3.

FIG. 3

A central processing unit 301 fetches and executes instructions and manipulates data. Frequently accessed instructions and data are stored in a high-speed cache memory 302. Said central processing unit 301 is connected to a system bus 303. System bus 303 provides connectivity with a larger main memory 304, which requires significantly more time for the CPU to access than the cache 302. The main memory 304 contains between sixty-four and two hundred and fifty-six megabytes of dynamic random access memory. A hard disk drive (HDD) 305 provides non-volatile bulk storage of instructions and data. A graphics card 306 receives graphics data from the CPU 301, along with graphics instructions and supplies graphical data to visual display unit 308. The I/O device 307 or universal serial bus 308 receive input commands from keyboard 209 and mouse 210. Zip drive 206 is primarily provided for the transfer of data, such as, and CD-ROM drive 203 is provided for the loading of new executable instructions to the hard disk drive 305 and the storing of application data. A network card 309 provides connectivity to the local area network 211 and a modem 310 provides connectivity to the Internet 107 via a telephone connection to the user's ISP. The equipment shown in FIG. 3 constitutes a personal computer of fairly standard type, such as an IBM compatible PC or Apple Macintosh.

Figure 4:
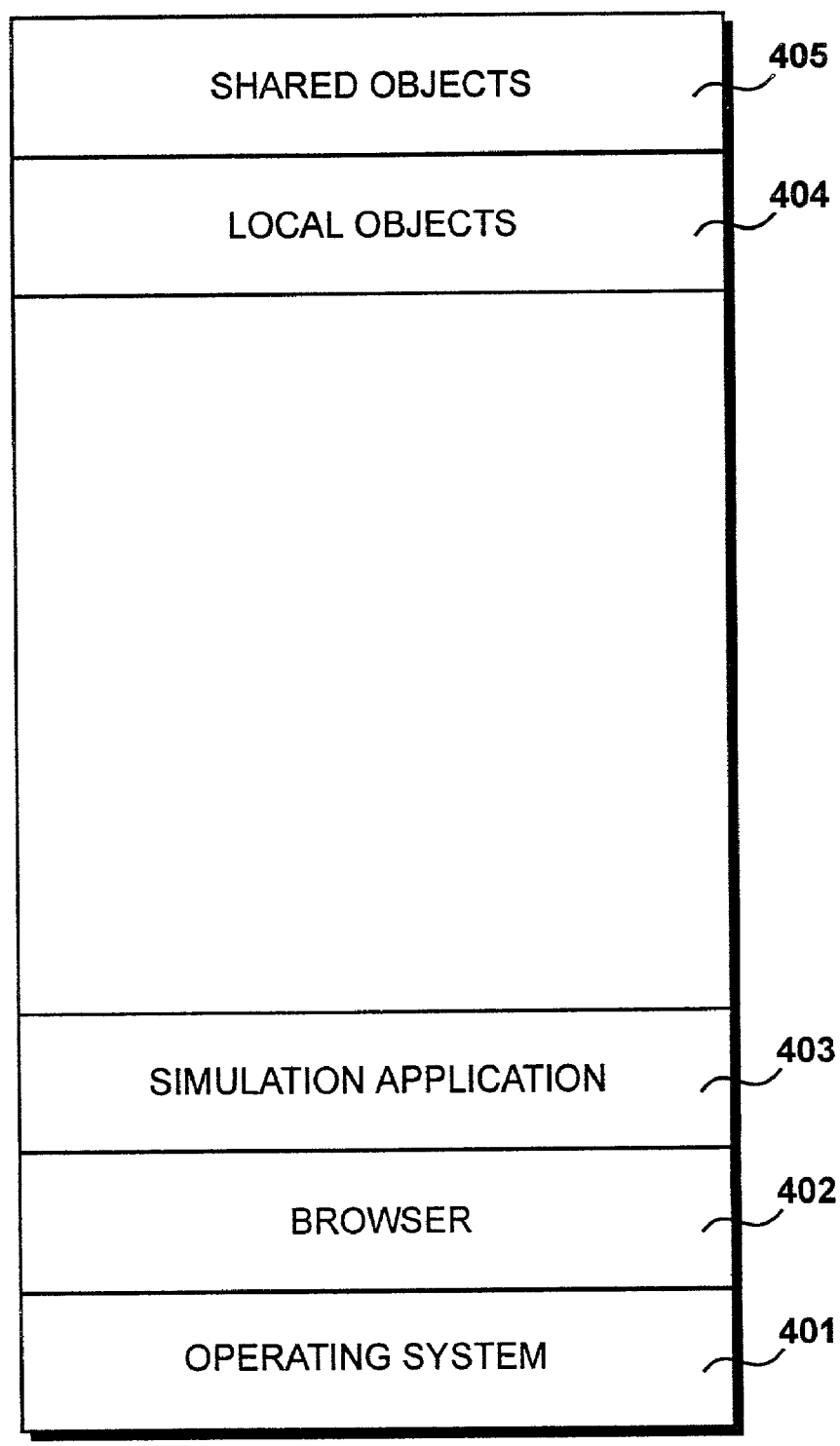
FIG. 4 details the contents of the memory shown in FIG. 3.

The contents of the main memory 304 shown in FIG. 3 of the user's personal computer 202 shown in FIGS. 1 and 2 are detailed according to the prior art in FIG. 4.

FIG. 4

An operating system, including a basic BIOS is shown at 401. This provides common functionality shared between all applications operating on the computer terminal 202, such as disk drive access, file handling and window-based graphical user interfacing. An Internet browser is shown at 402, which includes a file browser and other items, that are usually present but inactive on the user's graphical desktop. The simulation application 403 includes the program steps required by the CPU 301 to act upon vehicles objects within the computer-generated environment, the type of which comprise either local objects 404 or shared objects 405, also known to those skilled in the art as modeled entities.

Local objects 404 are the components of user 201's entity which, in the example, are for instance the fixed and variable attributes of an aeroplane. Fixed attributes traditionally include the aircraft's three-dimensional model, known to those skilled in the art as 'wireframe model', the bitmapped textures applied to said wireframe model and the various weapons that can be used by said aircraft. Variable attributes include the positional data which can be expressed as the aircraft's three-dimensional position, velocity and angle of direction within the computer-generated environment, and also whether the aircraft has fired a weapon or not. The simulation application 403 performs program steps to equip the aircraft with data inputted by user 201 by means of keyboard 209 and/or mouse 210, i.e. modify its variable attributes in answer to the user's control decisions. Simulation application 403 subsequently broadcasts the related aircraft state changes to server 103 in order to update the remote instantiations of said aircraft accordingly at every computer terminal logged onto the network, such as the Internet 107, and partaking in the same simulation application as user 201.

Shared objects 405 are the variable attributes of the remote entities within the computer-generated environment which are controlled by the other users logged onto the network, such as the Internet 107, and partaking in the same simulation application as user 201. Simulation application 403 locally instantiates the fixed variables of said remote entities and equips said remote entities with positional and event data received and updated from the server 103 which co-ordinates the computer-generated environment. As more users partake in the simulation, i.e. evolve within the virtual battlefield by means of their respective entity, more corresponding remote entities are instantiated by each individual simulation application node and thus more shared objects require updating.

It was previously explained that said shared objects must be updated as frequently as possible in order to sustain the immersive character, i.e. 'believable reality' portrayed by such an application, in order for user 201 to react correctly to events displayed on VDU 208 from the simulation application 403. Early generations of simulation applications involving multiple networked users relied on updating the shared objects 405 by a complete dataset, including fixed and variable attributes. Such early art is most inappropriate for networks with a narrow bandwidth, because every object update would require seconds as opposed to hundreds of milliseconds, resulting in a display refreshment rate of one frame per many seconds given the amount of data to broadcast and process, and thus would render the application unrealistic. Moreover, said updates would irremediably vary in frequency and contents, as in open networks such as the Internet 107, said narrow bandwidth is known to fluctuate quite importantly and when bandwidth becomes insufficient for the amount of data to transmit, entire packets of data are lost before they arrive at each node or are delivered too late at said nodes for processing and rendering at a satisfactory frame rate. Said missing packets of data is a problem known to those skilled in the art as 'packet loss'.

Figure 5:
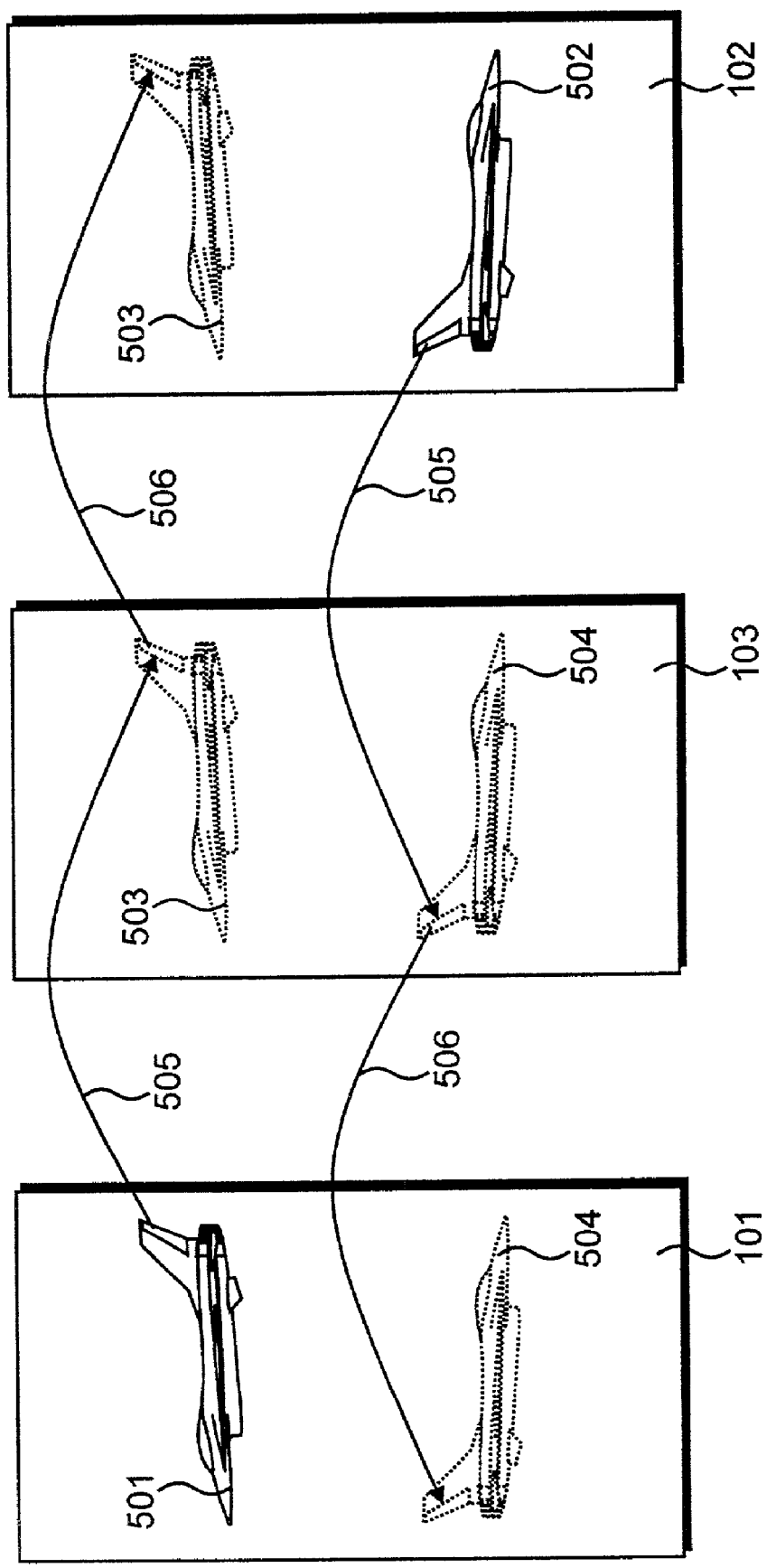
FIG. 5 illustrates the contents of the memory of each user terminal shown in FIGS. 1 to 4 for a given fluctuating bandwidth when PHBDR according to the prior art is implemented.

According to the prior art, Position History-Based Dead Reckoning (PHBDR) is implemented in order to reduce the amount of updating information which must be circulated throughout the network to each simulation node, such that the problem posed by 'packet loss' is minimised. The contents of the respective main memories 304 of computer terminals shown in FIGS. 1 to 4 for a given fluctuating bandwidth when PHBDR is implemented according to the prior art are shown in FIG. 5.

FIG. 5

In the example, computer terminal 101 is connected to the Internet 107 via ISP 104 and its user controls an aircraft 501 stored as a local object in its main memory. Computer terminal 102 is also connected to the Internet 107 via ISP 105 and its user controls an aircraft 502 stored as a local object in its main memory. Upon the computer terminal 101 logging onto the server 103 over the network 107, its aircraft object 501 is instantiated at said server 103 as a set of fixed attributes and remote variable attributes which define a remote aircraft 503. Similarly, upon the computer terminal 102 logging onto the server 103 over the network 107, its aircraft object 502 is instantiated at said server 103 as a set of fixed attributes and remote variable attributes which define a remote aircraft 504. Said remote aircraft 503 is instantiated at terminal 102 controlling local aircraft 502 and corresponding remote aircraft 504 and said remote aircraft 504 is instantiated at terminal 101 controlling local aircraft 501 and corresponding remote aircraft 503.

Position History-Based Dead Reckoning implemented into the simulation application 403 according to the prior art extrapolates the future position, expressed as (x, y, z) co-ordinates, of the shared objects based upon a plurality of previous and recent (x, y, z) positions occupied by said remote objects within the three-dimensional computer-generated environment. Said extrapolation derives either a line axis or a curve along which a remote object is expected to move, from three or more recent three-dimensional positions sequentially occupied by the object, and improved embodiments of said PHBDR protocol are known to also derive an object's velocity and angle of direction within the computer-generated environment. A threshold is defined by the programmer who implements said PHBDR into the simulation application 403, such that the position of said remote object only requires updating if the error between the actual (x, y, z) position and the extrapolated positional (x, y, z) values of the corresponding local object exceed said threshold. For the purpose of simulation cohesiveness, a minimal number of updates per second is also defined by the programmer who implements said PHBDR into the simulation application 403, traditionally of the order of five updates per second for a minimum of thirty frames displayed on VDU 208 per second.

Thus, upon the user 201 operating computer terminal 101 imparting movement or an event to aircraft 501, the local simulation application 403 performs a program step to update the object's corresponding data stored on server 103 and thus broadcasts (505) a state change including the required updating data to said server 103. Said updating data from computer terminal 101 transits via ISP 104 to ISP 106, which in turns transmits said updating data to server 103.

The server 103 subsequently performs a program step to update the remote aircraft 503 corresponding to the local object 501 controlled by computer terminal 101, which is stored at all of the remote simulation application nodes currently logged onto the network it coordinates, such as the simulation application 403 running on computer terminal 102, and thus broadcasts (506) said state change according to the PHBDR protocol explained thereabove. Said updating data from server 103 transits via ISP 106 to ISP 105, which in turns transmits said updating data to computer terminal 102.

The position of the remote aircraft 503 stored at computer terminal 102 is extrapolated five times for displaying said aircraft over five frames and then updated with the movement or event imparted to aircraft 501 by user 201, unless the difference between the extrapolated and actual three-dimensional co-ordinates exceeds the implemented threshold inside of five extrapolated frames and thus triggers an earlier update from server 103. The user of computer terminal 102 is now able to make decisions regarding input with which to impart the local aircraft 502 in response to the behaviour of updated remote aircraft 503.

Figure 6:
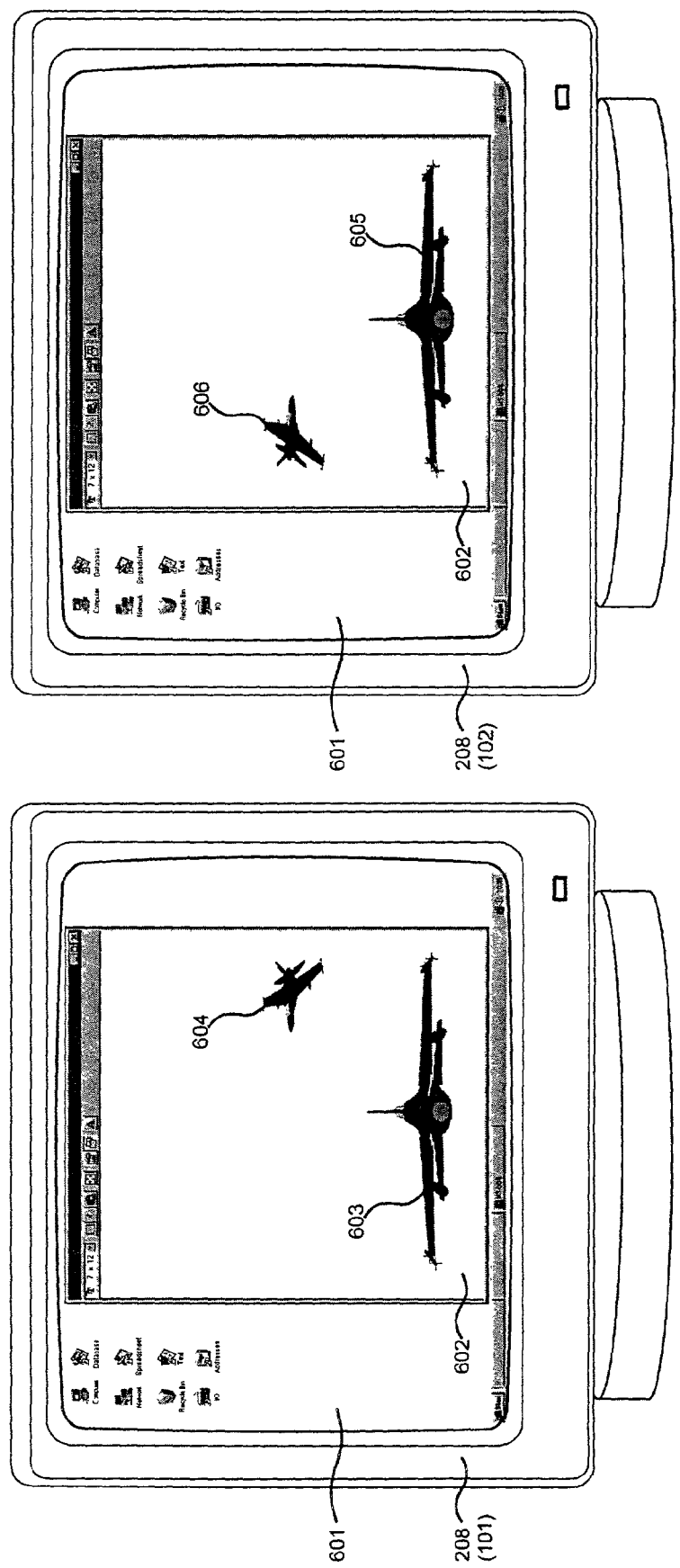
FIG. 6 provides a graphical representation of the Graphical User Interface displayed by the Video Display unit of any one of the user terminals shown in FIG. 5.

A graphical representation of the graphical user interface (GUI) of simulation application 403 as displayed by the respective Video Display Units of computer terminals 101 and 102 is shown in FIG. 6.

FIG. 6

VDU 208 of computer terminal 101 displays the GUI 601 of the computer terminal's operating system 401, within which a windowed GUI 602 of the local simulation application 403 is also displayed. Within said GUI 602, a rendered graphical representation 603 of local aircraft 501 can be observed, as well as a rendered graphical representation 604 of remote aircraft 504. Said rendered graphical representation 603 is displayed from a point of view situated at the back of aircraft 501, as user 201 must be able to view the three-dimensional computer-generated environment in front of said aircraft in order to correctly decide which actions to impart the aircraft with, for instance in order to 'fly' above a mountain ridge or 'shoot' at the remote aircraft 504.

Similarly, VDU 208 of computer terminal 102 displays the GUI 601 of the computer terminal's operating system 401, within which a windowed GUI 602 of the local simulation application 403 is also displayed. Within said GUI 602, a rendered graphical representation 605 of local aircraft 502 can be observed, as well as a rendered graphical representation 606 of remote aircraft 503. Said rendered graphical representation 605 is displayed 10 from a point of view situated at the back of aircraft 502, as the user of computer terminal 102 must be able to view the three-dimensional computer-generated environment in front of said aircraft in order to correctly decide which actions to impart the aircraft with, for instance in order to 'fly' so as to evade fire from the remote aircraft 503 or 'shoot' at it.

Throughout the course of the simulation experience, the GUI 602 at computer terminal 101 refreshes the action displayed to user 201 based upon the actual three-dimensional position of local aircraft 501 and the extrapolation of the three-dimensional position of remote aircraft 504, and likewise at computer terminal 102, wherein the action is displayed based upon the actual three-dimensional position of local aircraft 502 and the extrapolation of the three-dimensional position of remote aircraft 503.

Figure 7:
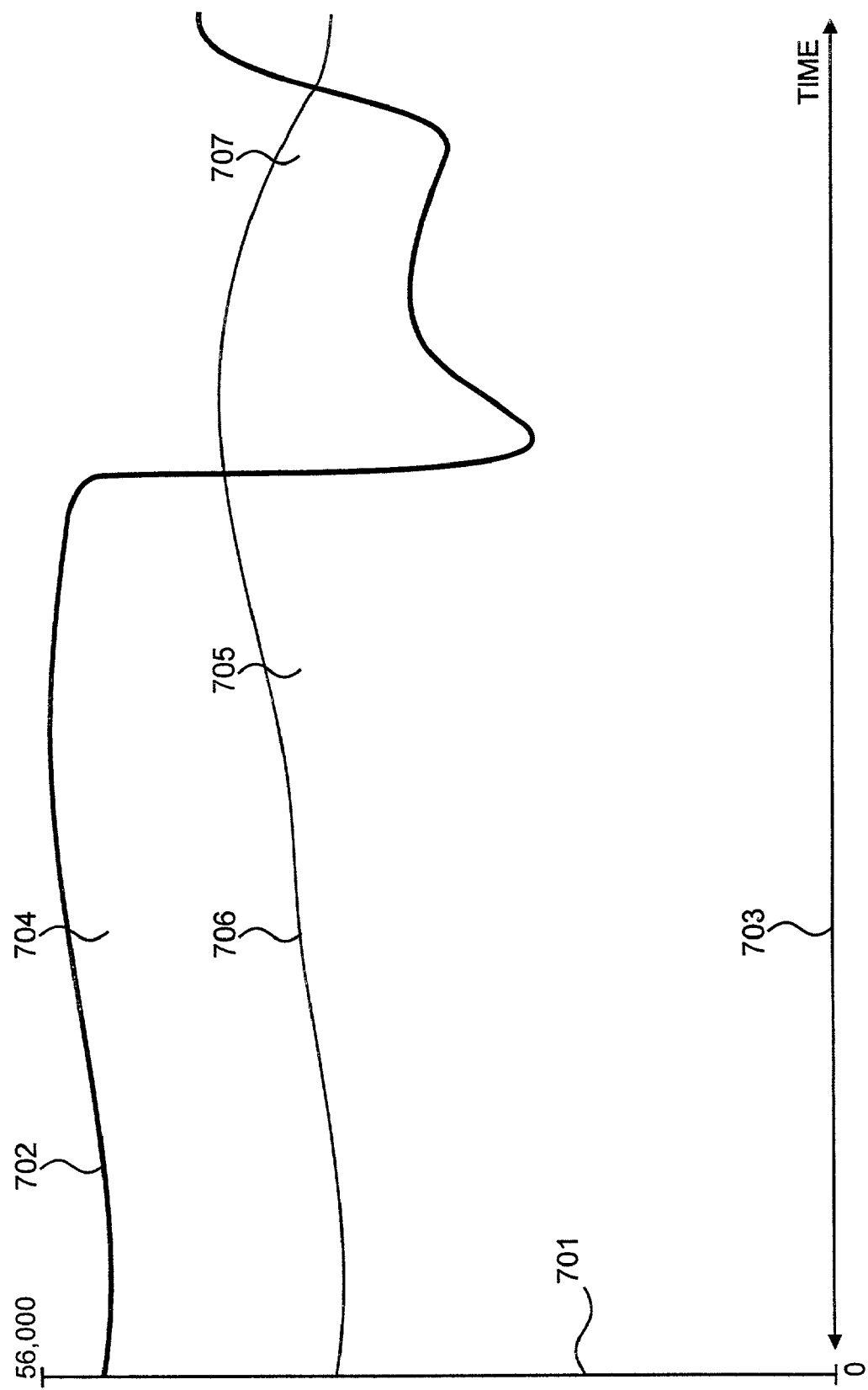
FIG. 7 illustrates updating information sent to the user terminals shown in FIGS. 1 to 4 for a given fluctuating bandwidth when PHBDR according to the prior art is implemented.

However, as more participants log onto server 103 and partake in the distributed simulation application, and thus more remote vehicle objects are instantiated at every participating terminal and require updating, even PHBDR according to the prior art suffers from the problem of 'packet loss' when the amount of data corresponding to the required number of concurrent updates exceeds the available bandwidth. The situation of packet loss when PHBDR is implemented according to the prior art is graphically detailed in FIG. 7.

FIG. 7

The amplitude 701 of the total available network bandwidth is represented as a vertical axis and ranges between the minimum value of zero bit per second and the maximum value of 56,000 bits per second, the later value corresponding to the typical modem connection speed of a computer terminal connected to the Internet 107. It is known that said maximum value, represented by continuous line 702, fluctuates unpredictably over time, represented by horizontal axis 703. Said fluctuation arises from the varying amount of data transmitted by the network at any point in time, known to those skilled in the art as 'network traffic', and also from key network points—such as ISP servers—logging on and off said network for reasons of maintenance or failure.

The early prior art discussed earlier relied on constantly utilising the entire available bandwidth 704 for updating remote objects. The PHBDR protocol according to the prior art relies on updating remote objects on a need-only basis, with only few updates per second required to reconcile the extrapolated position and actual position of a shared object, thereby decreasing the amount of network traffic to only the portion of bandwidth 705 required to transfer said updating data.

However, said portion of bandwidth 705 also fluctuates as more participants log onto the network and partake in the simulation application 403. There is thus the potential for said portion 705 to rise to a maximum value 706 at a point in time where the maximum value 702 of the network bandwidth fluctuates to a value below said value 706, thereby generating a 'packet loss' 707. Said packet loss 707 is a portion of the data transiting within portion 705 and required to update one or a plurality of remote objects at a receiving node, and said portion of data will consequently not form part of the packet of updating data arriving at the receiving node. The respective positions of said remote objects therefore keep being extrapolated until such time as a complete packet of updating data is received, wherein their positions and also states are then abruptly and unrealistically adjusted and potentially render any local input decision redundant at said receiving node.

Faster open network connections, such as 'T3' known to those skilled in the art, are available and provide an increased amplitude 701, but with regard to the scalability required of simulation application 403, in order to accommodate potentially hundreds of thousands of concurrent users, the problem of packet loss remains nevertheless identical. A greater number of concurrent users is required than would be in the situation detailed in FIG. 7 in order to eventually generate the same problem.

The present invention discloses a solution to the problem affecting the known prior art by providing a computer network and a method to define and update shared objects, wherein the updating of said shared objects is based upon the distance between the local object and the remote objects within the same computer-generated environment. Whereas the prior art implements the server-based updating of shared objects and the PHBDR protocol based upon whether an object is present within the computer-generated environment or not, the present invention does not require a server such as server 103 to arbitrate actual and extrapolated positional values and also provides an improved PHBDR protocol wherein the distance between the local object and the remote objects within the same computer-generated environment determines the frequency with which remote objects are updated. An improved embodiment of the present invention provides the distance-based PHBDR protocol with a quality factor, wherein said quality factor further determines said frequency based upon the available bandwidth at the time of sending packets of updating data.

Figure 8:
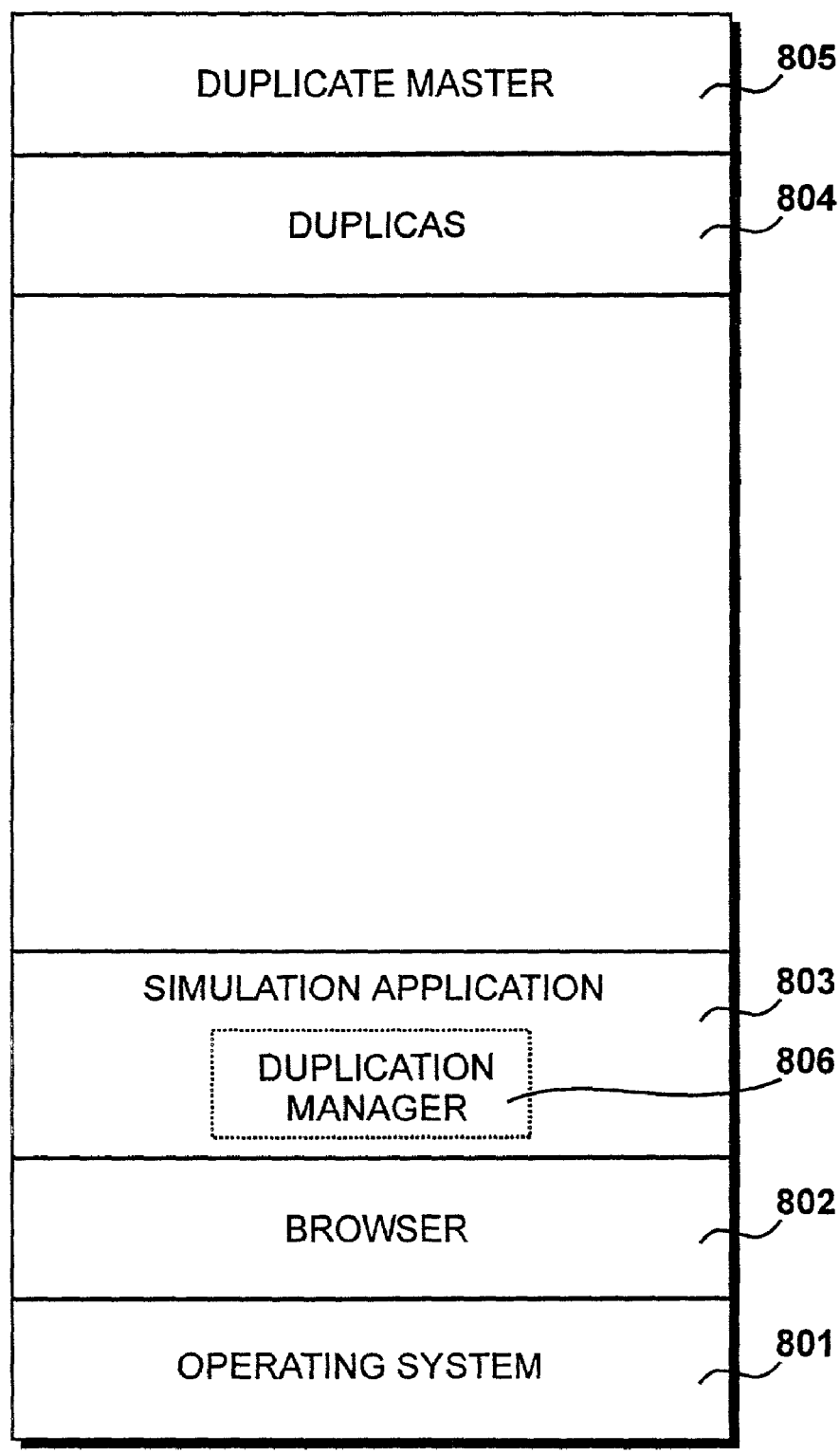
FIG. 8 details the contents of the memory shown in FIG. 3, including a duplication manager and duplicated objects according to the invention.

According to the invention, the contents of the main memory 304 of the user's personal computer 101 shown in FIG. 3 are summarised in FIG. 8.

FIG. 8

An operating system, including a basic BIOS is shown at 801. This provides common functionality shared between all applications operating on the computer 101, such as disk drive access, file handling and window-based graphical user interfacing. An Internet browser is shown at 802, which includes a file browser and other items, that are usually present but inactive on the user's graphical desktop. The simulation application 803 comprises the program steps required by the CPU 301 to act upon vehicles objects within the computer-generated environment, which are known as 'duplicated objects' according to the invention and comprise either duplicas 804 or duplicate masters 805, and said program steps also include a duplication manager 806.

The duplication manager 806 is responsible for allocating the portion of main memory 304 necessary to the successful establishment of duplicated objects and for servicing said duplicated objects throughout their life-cycle. The duplication manager 806 also monitors the machines from which it receives data from remote duplicate masters 805 using keep-alive procedures. For instance, in the case of a communication failure, the duplication manager 806 ensures that only one duplica 804 will take over the responsibility of a duplicate master 805. Similarly, in the case of a new computer terminal connecting to the network 107, the duplication manager 806 detects said connection and informs the duplicate master 805 to take appropriate subsequent action. Finally, outside the context of a fault-induced triggering event as described above, the load-balancing task of the duplication manager 806 can also be performed automatically, the result of which is also to switch the state of a duplicate to the state of duplicate master 805 and toggle the state of the previous duplicate master 805 to the state of duplica 804.

The duplicated objects can be either duplicas 804 or duplicate masters 805. They provide object duplication functionality and include dynamic elements, such as attributes and methods, with methods performing attributes processing. Upon being informed by the duplication manager 806 of a new computer terminal that said new computer terminal has connected to the network, the duplication manager 806 in charge of the duplicate master 805 determines whether applications running on said new computer terminal require a duplicate and, subsequently, the duplication manager 806 of said new computer terminal creates a local duplica and the duplicate master 805 provides the most recent data or object to said duplica in the main memory of said new computer terminal, so that said the duplica can operate in synchronicity with the duplicate master 805.

A duplicate master 805 contains generic or application-specific data, which requires sharing over a network in synchronicity with its duplicas. It acts as a coordinator between a shared application and its duplicas, such that changes on the duplicate master 805 are propagated to its duplicas, in order to preserve system integrity. As apex coordinator, the duplicate master 805 is equipped with a mechanism allowing it to trigger a locally-executed method on all remote duplicas 804, called an action.

A duplica 804 is structured with potentially the same functionality as a duplicate master 805, but initially only maintains information for local data access and performs methods for local processing. As dependent from the duplicate master 805, the duplica 804 is equipped with a mechanism allowing it to trigger a locally-executed method on the duplicate master 805, called reversed action. For instance, should a duplica 804 require a change in the data it contains in answer to an application command, it will trigger a reversed action and obtain updated information from the duplicate master 805.

Figure 9:
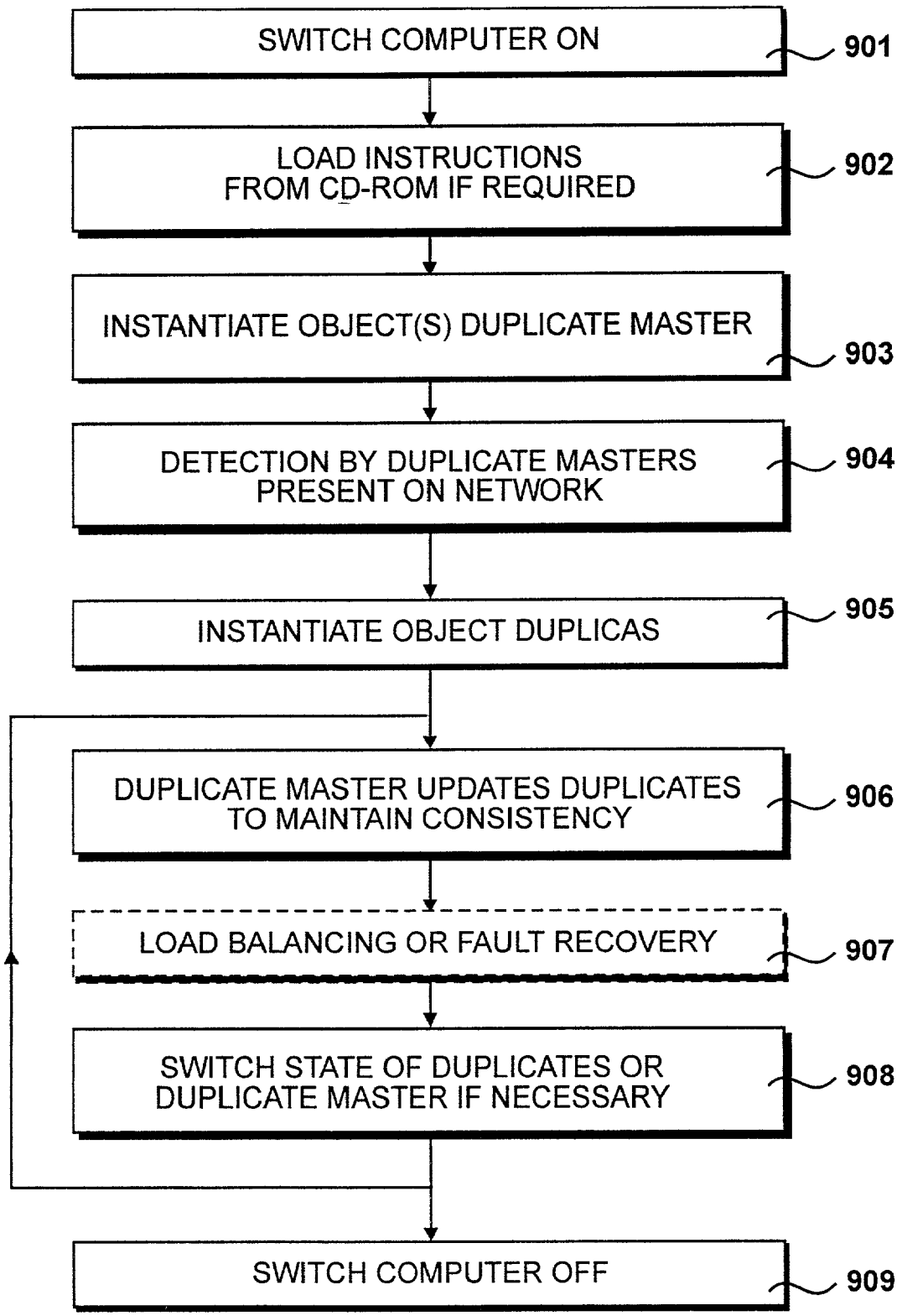
FIG. 9 summarises actions performed at a user terminal when logging onto a shared environment according to the invention.

Actions performed at a user terminal according to the invention when logging onto a computer-generated environment are summarised in FIG. 9.

FIG. 9

Upon activation of a computer terminal 101 at step 901, the instructions necessary for the simulation application 803 and duplication manager 806 to carry out their program steps may need to be loaded from an external medium, such as CD ROM 204, at step 902.

As the simulation application 803 and the duplication manager 806 within said simulation application 803 are launched locally, the local entity controlled by the user 201 is instantiated in main memory 304 as a duplicate master 805. Computer terminal 101 then connects to the network 107 in order to join in the computer-generated environment shared between other networked-connected users.

Upon establishing the network connection, said duplicate master 805 is simultaneously detected by all remote duplication managers 806 currently connected to the same network group as said computer terminal 101 at step 904, for instance the respective duplication managers 806 of computer terminal 102 and server 103 which, in the example according to the invention, is now computer terminal 103. Each remote duplicate master 805 comprising data and methods then creates a local duplica 804 in the main memory of the local user terminal 101 from its current set of information available at step 905. The simulation application 803 at terminal 101 can now access data in the respective duplicas 804 of the entity controlled by said terminals 102 and 103 and process said data locally via the instructions associated with said duplicas.

The duplicate master 905 ensures that its respective duplicas 804 are regularly updated in order to achieve and maintain data consistency at step 906.

As more users join in said computer-generated environment, the main memory 304 of user terminal 101 stores the duplicate master 805 and an increasing plurality of duplicas 804, such that the total processing activity load placed upon the CPU may eventually exceed a delimited amount necessary for the fluid operation of the simulation application 803, including the duplication manager 806, stored in its memory. A typical instance where the user can ascertain whether they need to perform a load balancing instruction at step 907, in order to alleviate said processing load placed upon said CPU, occurs when the frame update rate of simulation application 803 decreases below a threshold value of typically fifteen frames per second, which represents the frame update rate required to portray fluid motion of entities.

In this instance, the duplicate master 805 therefore switches the state of a remote duplica 804 to the state of duplicate master at step 908, in effect delegating its master status to said remote duplica, in order to balance the resource load generated by the duplication manager 806 and duplicate master 805 between the local and remote sets of user terminal CPU resources. Thus, the main memory 304 of user terminal 101 stores the duplicate master 805 and an increasing plurality of duplicas 804, the state of any of which can also be switched to the state of duplicate master 805 according to load balancing instructions performed remotely. Said state change is transparent, i.e. the user 201 remains unaware of the state change of the duplicas stored in the main memory of user terminal 101.

Alternatively, if the main memory of the user terminal 101 which stores the duplicate master 905 becomes unavailable on the network 107, i.e. if the keep-alive procedures are breached by loss of connectivity, then the duplication manager performs fault recovery at step 907. Remote duplication managers 806 elect only one duplica 804 to become the duplicate master 805 and then switch the state of this remote duplica to the state of a duplicate master, ensuring that a single duplica amongst all identical duplicas present on a network takes over the responsibility of sharing and updating the data. As at step 908, the user remains unaware of the state change of the duplica stored in the main memory of the user terminal they operate.

Figure 10:
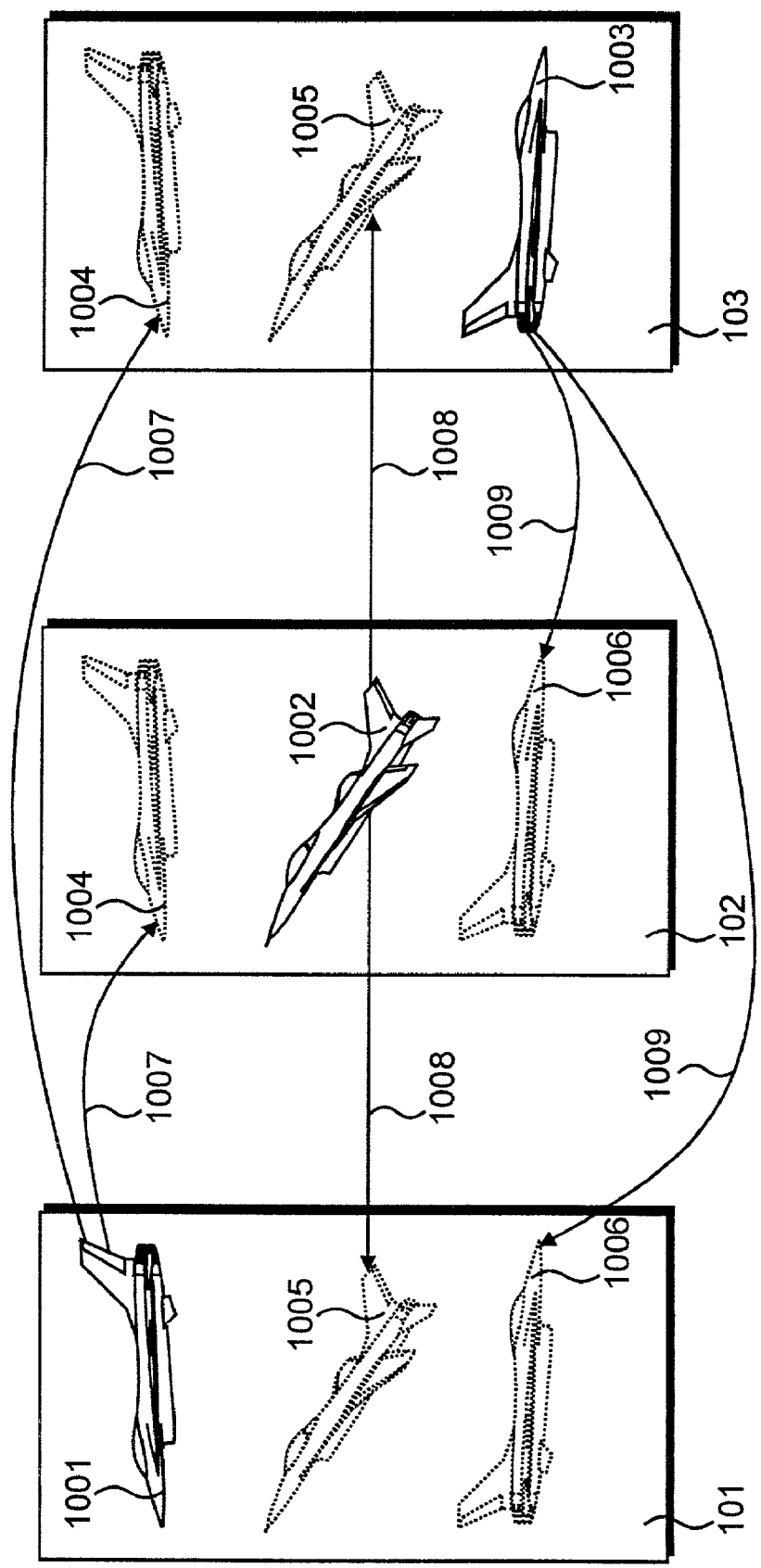
FIG. 10 illustrates the contents of the memory of each user terminal shown in FIGS. 1 to 3 and FIG. 8 for a given fluctuating bandwidth when PHBDR according to the invention is implemented.

The contents of the respective main memories 304 of each computer terminals show in FIGS. 1 to 3 for a given fluctuating bandwidth when PHBDR is implemented according to the invention are shown in FIG. 10.

FIG. 10

Whereas a server 103 was necessary to implement PHBDR according to the prior art and distribute shared objects in terms of variable data updates, the present invention dispenses with said server and, as previously explained, server 103 is now to be considered as any other computer terminal connected to network 107. In the example, computer terminal 101 is connected to the Internet 107 via ISP 104 and its user controls an aircraft 1001. According to the invention, said aircraft 1001 is initiated and stored as a duplicate master 805 according to steps 901 to 903. Computer terminals 102 and 103 are also connected to the Internet 107 via ISP 105 and 106 respectively, and their respective users each control an aircraft 1002, 1003 stored as stored as a duplicate master 805 in their respective main memories.

If computer terminals 102 and 103 are logged onto the network 107 before computer terminal 101, upon the computer terminal 101 logging onto said network 107, its aircraft object 1001 is instantiated as a remote shared object 1004 at each computer terminal 102 and 103 wherein it is stored as a duplica 804, according to steps 904 and 905. Similarly, if computer terminals 101 and 103 are logged onto the network 107 before computer terminal 102, upon the computer terminal 102 logging onto the network 107, its aircraft object 1002 is instantiated as a remote shared object 1005 at each computer terminal 102 and 103 wherein it is stored as a duplica 804, and likewise for aircraft object 1003 of computer terminal 103 instantiated as a remote shared object 1006 if computer terminals 101 and 102 are logged onto the network 107 before computer terminal 103.

A duplicate master stored in the main memory of any one of said computer terminals connected to network 107 updates its duplicas stored at the other computer terminals connected to said network, according to step 906. Thus, duplicate master 805 at computer terminal 101, i.e. aircraft object 1001, updates (1007) the duplicas 804, i.e. aircraft objects 1004 stored at computer terminals 102 and 103. Likewise, duplicate master 805 at computer terminal 102, i.e. aircraft object 1002, updates (1008) the duplicas 804, i.e. aircraft objects 1005 stored at computer terminals 101 and 103 and duplicate master 805 at computer terminal 103, i.e. aircraft object 1003, updates (1009) the duplicas 804, i.e. aircraft objects 1006 stored at computer terminals 101 and 102.

Figure 11:
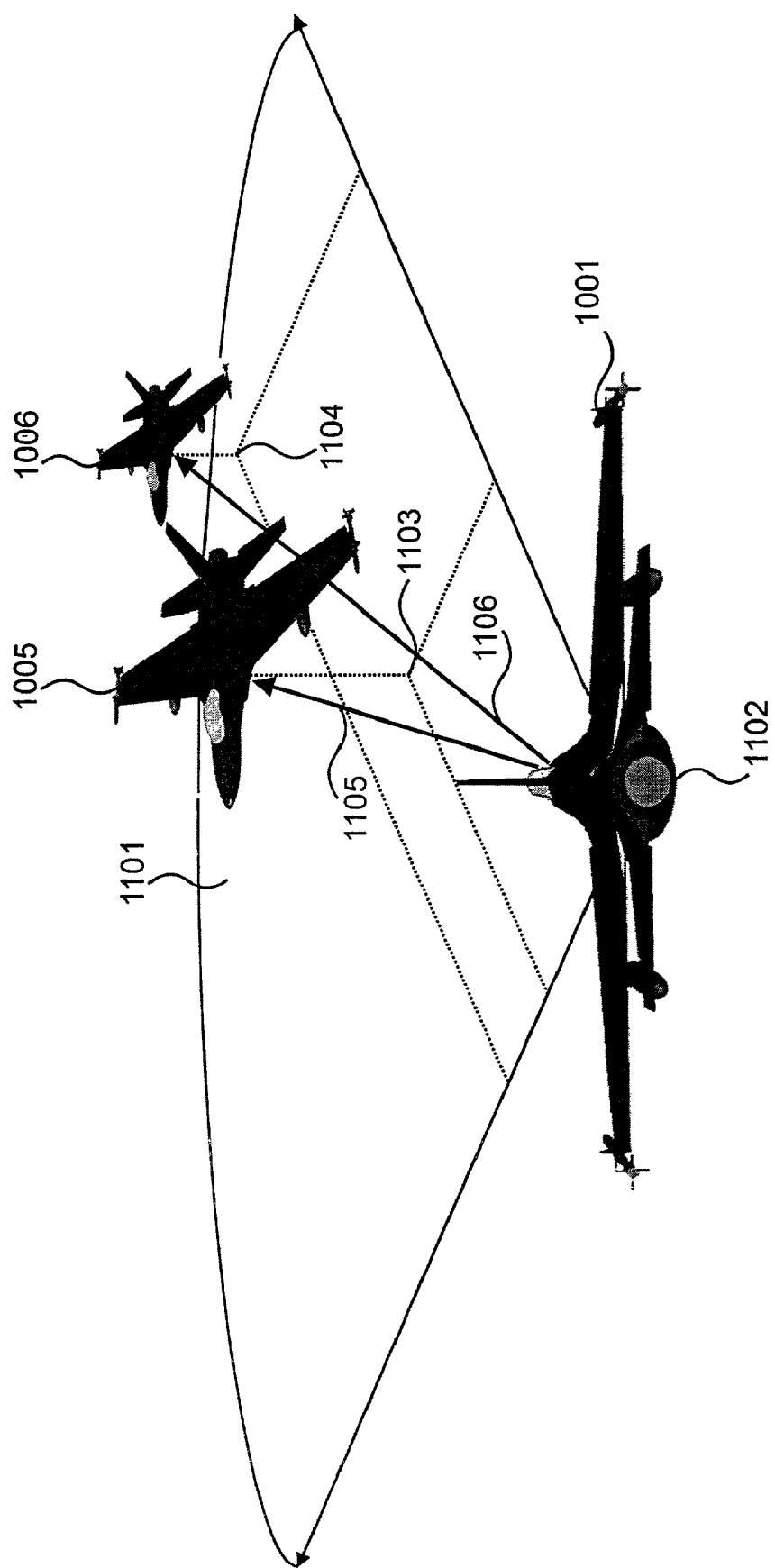
FIG. 11 represents distance between duplicated objects, including an observer.

In the case of many thousands of concurrent users of simulation application 803 connected to network 107, all of whom interacting within the same computer-generated environment, the above updates would involve thousands of duplicate masters updating many more thousands of duplicas and a solution must therefore be implemented in order to further reduce the amount of network traffic generated by said updating activity. The present invention implements the calculation of the distance between shared objects, i.e. between duplicate masters 805 and duplicas 804, within said PHDR protocol in order to determine the degree of relevance according to which shared objects should be updated at every local simulation application 803. Said distance between shared objects is illustrated in FIG. 11.

FIG. 11

Aircraft 1001 of computer terminal 101 is shown, along with aircraft 1005 duplicated from aircraft 1002 of computer terminal 102, and aircraft 1006 duplicated from aircraft 1003 of computer terminal 103. The field of vision 1101 represents the tri-dimensional field of vision afforded by means of GUI 602 to the user 201 of computer terminal 101 when engaging in the simulation application 803. Said field of vision, or point-of-view, is the visible portion of the entire computer-generated environment within which user 201 controls aircraft 1001 and, as said computer-generated environment is three-dimensional, every shared object is equipped with three-dimensional width, height and depth (x, y, z) co-ordinates. Aircraft 1001 is thus equipped with (x, y, z) co-ordinates 1102, aircraft 1005 is equipped with (x, y, z) co-ordinates 1103 and aircraft 1006 is equipped with (x, y, z) co-ordinates 1104.

Traditionally, aircraft 1001 of user 201 is referred to as the 'observer', as it is the origin of the field 1101 at computer terminal 101. However, aircraft 1002 at computer terminal 102 is also referred to as the 'observer', as it is the origin of a field of view similar to field 1101 which represents the tri-dimensional field of vision afforded by means of GUI 602 to the user of computer terminal 102 when engaging in the simulation application 803. As it was previously explained that the aircraft controlled at a computer terminal is the duplicate master of said aircraft duplicas over the entire network 107, said duplicate master is an observer and duplicas are observed. More generally, according to the invention, the observer is the object which defines the origin of the field of vision 1101 from which the three-dimensional computer-generated environment is observed and, according to refinements known those skilled in the art implemented in the rules of simulation application 803, user 201 may at any time 'switch' said origin from his aircraft 1001 to any of the objects present within said three-dimensional computer-generated environment, including for instance aircraft 1005, thereby making a duplica the observer.

In the example, the respective three-dimensional co-ordinates 1103, 1104 of aircrafts 1005 and 1006 places said aircrafts in the computer-generated environment in front of aircraft 1001 and said aircrafts are visible to user 201. A distance 1105 therefore separates aircraft 1001 from aircraft 1005 and a distance 1106 therefore separates aircraft 1001 from aircraft 1006. Thus, a distance separates duplicate master 805, which is the observer, from the duplicas 804, which are observed.

Figure 12:
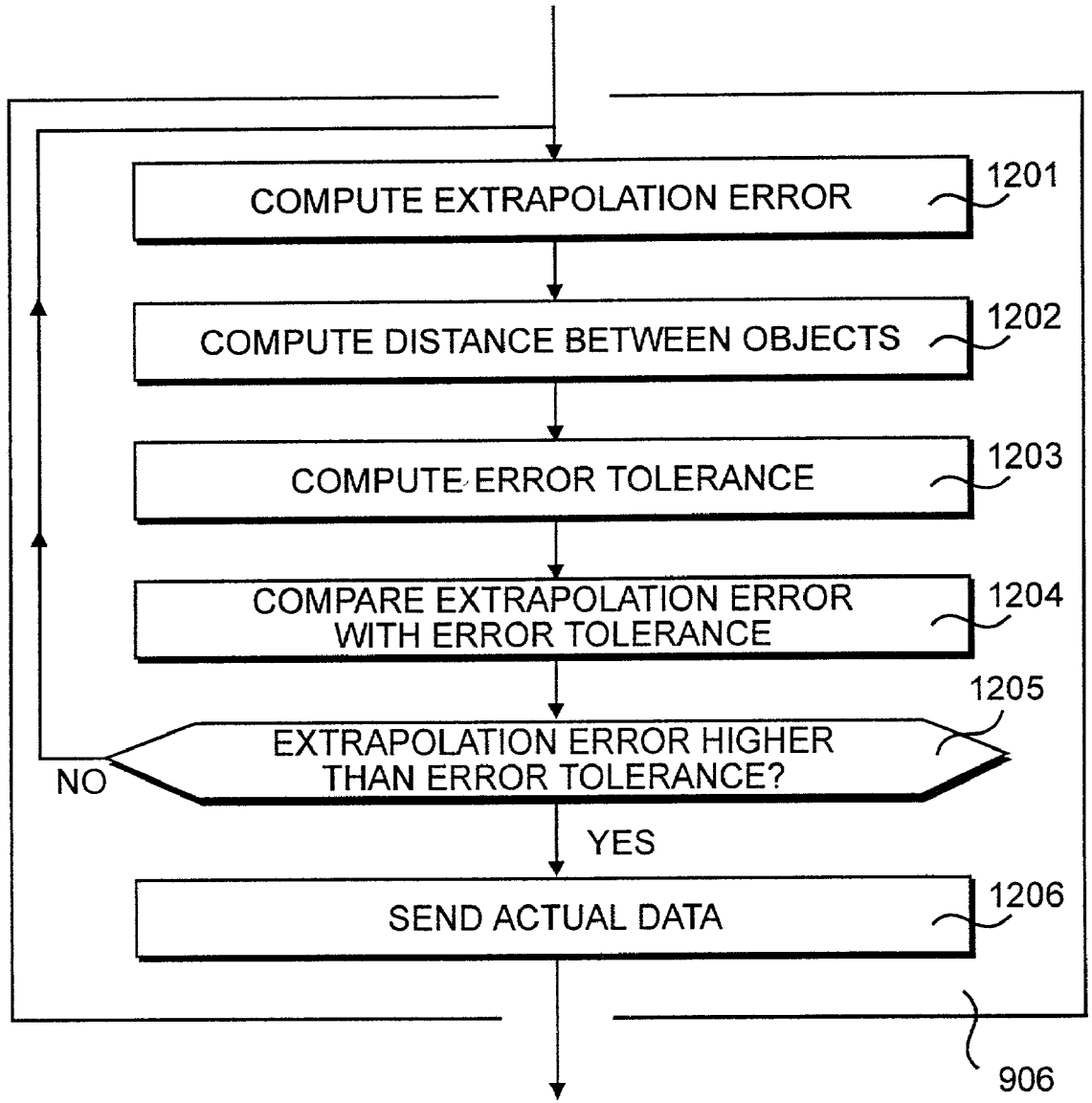
FIG. 12 summarises actions performed when updating duplicated objects shown in FIGS. 8 to 11.

Actions performed by the simulation application 803 when a duplicate master updates a duplica, including calculating a distance shown in FIG. 11, are shown in FIG. 12, and FIG. 13 details the computations for deriving said distance between duplicated objects, including an observer, according to the invention.

At step 1201, the current extrapolation error is computed as the difference between the current value and the extrapolated value of a dataset, i.e. (x, y, z) co-ordinates of a duplica. The error is calculated according to the equation 1301 shown in FIG. 13, wherein the xi values are the values of different variables contained within the same dataset, and the xi' values are the extrapolated value of said variables. According to the invention, each of the variables of a dataset should have a similar range of values, such that no variable predominantly influences the result of the computation.

At step 1202, the distance between the observer 1001 and the duplica 1004 or 1005 observed is computed much in the same manner as the extrapolation error. Said distance is computed as the difference between the value of a dataset of the duplica and the value of a dataset of the observer, i.e. their respective (x, y, z) coordinates. The distance is calculated according to the equation 1302 shown in FIG. 13, wherein the xi values are the values of different variables contained within the duplica dataset, and the xi' values are the value of different variables contained within the observer dataset. According to the invention, each of the variables of a dataset should have a similar range of values, such that no variable predominantly influences the result of the computation.

The above distance illustrates a symmetrical relationship but it will be apparent to those skilled in the art that, more generally, the above distance embodies the relevance according to which the observer requires the observed duplicas to be updated. Variations of step 1202 to accommodate other types of relationship known to those skilled in the art are also claimed by the present invention. Said other types of relationship include for instance a 'line-of-sight' relationship, wherein the observer cannot 'see' a very close duplica because said duplica is placed behind an obstruction or even the observer itself: step 1202 thus also artificially increases the computed distance between the observer and said duplica as updates of said duplica are not required.

At step 1203, the error tolerance is computed as a function of the distance between the observer and the duplica. The error tolerance is calculated according to the equation 1303 shown in FIG. 13, wherein the dConstant variable defines a constant value for the error tolerance if no default tolerance is implemented in the application, the dLinear variable defines a ratio when a linear relationship between the error tolerance and the distance is implemented, and the dQuadratic variable defines a ratio when a quadratic relationship between the error tolerance and the distance is implemented, i.e. when there is no linear dependence. The Z variable is the distance computed at step 1202 according to the equation 1302. It can therefore be said that the tolerated error changes according to the computed value of the distance between the observer and shared objects.

According to the present invention, the precision of the extrapolation adjusts dynamically based upon the computed distance and said function of the distance between the observer and a duplica can be set such that the extrapolation error decreases as the distance between the observer and a duplica decreases: as a shared object moves closer to the observer, the error decreases and the object's dataset will be updated more frequently so that the duplica's (x, y, z) co-ordinates within the computer-generated environment are updated more frequently. Typically, said function of the distance between the observer and a duplica according to the invention is set such that a larger error is tolerated for shared objects rendered at a large distance from the observer and, inversely, a smaller error is tolerated for shared objects rendered closer to the observer.

At step 1204, the extrapolation error is compared with the error tolerance. If the extrapolation error is smaller than the error tolerance, then control is returned to step 1201 as the duplicate master 805 does not need to update its duplica 804, since the extrapolated value of said duplica's dataset is deemed acceptable for rendering. If the extrapolation error is greater than the error tolerance, however, then at step 1206 the duplicate master 805 updates its duplica 804 and transmits actual data, in the example (x, y, z) positional data, with which to equip said duplica. According to the invention, as the distance between the observer on each of networked computer terminals 101 to 103 and the shared objects at each of said networked computer terminals 101 to 103 can be different, updates may be sent at different frequencies. In the example, and referring back to FIG. 10, it can be observed that aircraft 1006 is further away from aircraft 1001 than aircraft 1005. Thus, the duplicate master 805 of aircraft 1005 at computer terminal 102 updates the duplica 804 of said aircraft 1005 at computer terminal 101 at a higher frequency than the duplicate master 805 of aircraft 1006 at computer terminal 103 updates the duplica 804 of said aircraft 1006 at said computer terminal 101.

Similarly, it can be observed that aircraft 1006 of computer terminal 103 is closer to aircraft 1005 of computer terminal 102 than to aircraft 1001 of computer terminal 101. Thus, the duplicate master 805 of aircraft 1006 at computer terminal 103 updates the duplica 804 of said aircraft 1006 at computer terminal 102 at a higher frequency than it updates the duplica 804 of said aircraft 1006 at computer terminal 101.

According to the invention, as more participants log onto network 107 and partake in the distributed simulation application 803, and thus more duplicate masters 805 and duplicas 804 are instantiated at every participating terminal and require updating, PHBDR according to the invention solves the problem of 'packet loss' as the amount of data corresponding to the required number of concurrent updates is dynamically minimised by means of the computation of the distance and thus constantly remains within the available bandwidth. The updating information shown in FIG. 7 when PHBDR according to the invention is implemented is graphically detailed in FIG. 14.

FIG. 14

As previously described, the amplitude 701 of the total available network bandwidth ranges between the minimum value of zero bit per second and the maximum value of 56,000 bits per second, the later value corresponding to the typical modem connection speed of a computer terminal connected to the Internet 107. Said maximum value, represented by continuous line 702, fluctuates unpredictably over time, represented by horizontal axis 703. Said fluctuation arises from 'network traffic', and also from key network points logging on and off said network for reasons of maintenance or failure.

It was previously explained that the PHBDR protocol according to the prior art relies on updating remote objects on a need-only basis, with only few updates per second required to reconcile the extrapolated position and actual position of a shared object, thereby decreasing the amount of network traffic to only the portion of bandwidth 705 required to transfer said updating data. However, as more users take part in simulation application 403 and therefore more shared objects require updates, the amount of data corresponding to said mounting number of updates increases to the extent of potentially using the entire available bandwidth and thus there remains the potential for generating a 'packet loss' 707. The respective positions of said shared objects therefore keep being extrapolated until such time as a complete packet of updating data is received, wherein their positions and also states are then abruptly and unrealistically adjusted and potentially render any local input decision redundant at said receiving node.

However, the PHBDR protocol according to the invention relies on updating remote objects on a need-only basis, wherein said need is assessed by means of the distance between the observer and observed shared objects rather than as a constant function. Shared objects within the computer-generated environment which the user 201 does not need to take into account when implementing entity control decisions are therefore barely updated at all, because such shared objects are too distant to the user's entity to be of importance, until such time as said user's entity becomes closer to said distant shared objects. The amount of data required in order to update close and distant shared objects at user 201's computer terminal is therefore constantly minimal, as said amount of data only includes updates pertaining to close-by duplicas rather than every duplica within the total computer-generated environment.

The maximum portion of bandwidth 1401 required to transfer said updating data is thus permanently lower than the portion 706 according to the prior art, as less updating data is transmitted. As more users take part in simulation application 803 and therefore more duplicas 804 require updating, the amount of bandwidth 1402 used to transmit said mounting number of updates remains minimal at all times. At each computer terminal, regardless of their number, the respective positions of said duplicas therefore keep being extrapolated and updated according to the PHBDR protocol of the present invention, wherein their positions and states are realistically adjusted without arbitrary positional updates arising from packet loss.

As the PHBDR protocol according to the invention minimises the amount of data transmitted to update the variable attributes of shared objects such that important bandwidth fluctuations do not generate any disruption of the updating action, a preferred embodiment of the present invention allows the computed error tolerance 1203 to dynamically adjust in function of the available bandwidth at any one time. Actions performed at step 906 according to a preferred embodiment of the invention in order to maximise the potential number of updates by the simulation application 803 are shown in FIG. 15, and FIG. 16 details the computation for deriving the error tolerance according to said preferred embodiment of the present invention.

Figure 15:
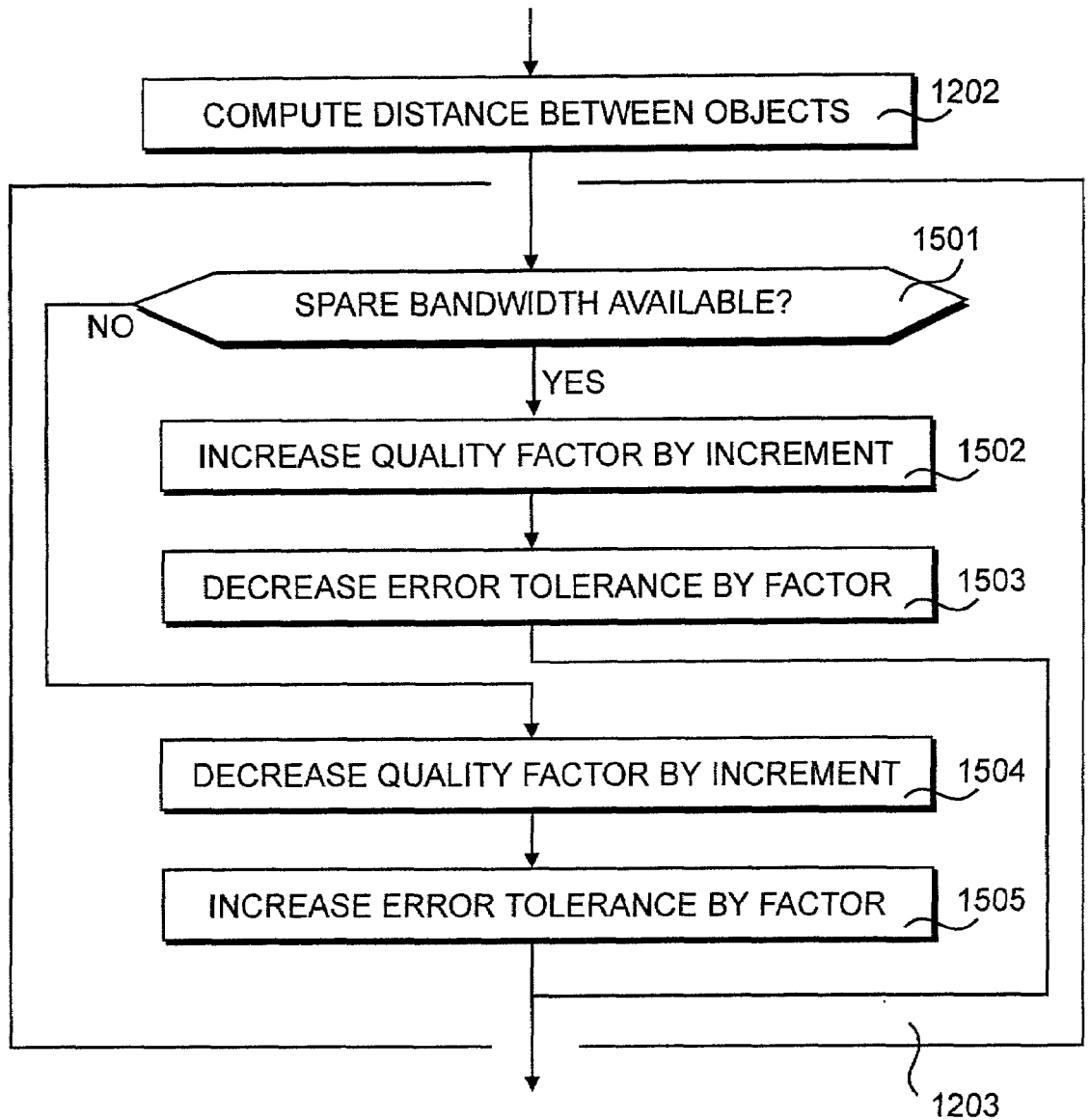
FIG. 15 summarises actions performed according to an improved embodiment of the invention to maximise the potential number of updates shown in FIG. 8.

FIGS. 15 and 16

It was previously explained that the error tolerance computed at step 1203 determines the frequency of updates when compared with the extrapolation error computed at step 1201. As the distance between the observer and the duplica decreases, a lower error tolerance 1203 increases the number of updates, thereby resulting in a better-updated duplica 804 which is more representative of the control decisions implemented by the computer terminal user who controls its respective duplicate master 805. Alternatively, as the distance between the observer and the duplica increases, a lower a higher error tolerance 1203 decreases the number of updates of said duplica 804, as the control decisions implemented by the computer terminal user who controls its respective duplicate master 805 are becoming less relevant to the computer terminal user who controls the observer.

According to a preferred embodiment of the present invention, the extrapolation error is computed at step 1201 according to the equation 1301 and the distance between the observer 1001 and the observed observed duplica 1004 or 1005 is computed at step 1202 according to the equation 1302. At step 1501, a question is asked as to whether any spare bandwidth is available for use. If answered positively, a quality factor 1601 is implemented in the computation of the error tolerance and increased by a pre-determined increment at step 1502, such that the value of the error tolerance computed at step 1503 according to the equation 1602 is decreased by a ratio equal to the distance computed at step 1202 divided by said incremented quality factor 1601.

If the question asked at step 1501 is answered negatively, however, a quality factor 1601 is implemented in the computation of the error tolerance and decreased by a pre-determined increment at step 1502, such that the value of the error tolerance computed at step 1503 according to the equation 1602 is increased by a ratio equal to the distance computed at step 1202 divided by said incremented quality factor 1601. The extrapolation error is then compared with the error tolerance according to step 1204. The effect of the quality factor 1601 is thus to dynamically maximise the potential number of updates in relation with the available bandwidth, without however incurring the problem of packet loss, by means of maximising or minimising the error tolerance and thus dynamically adjusting the comparison of step 1204.

Figure 14:
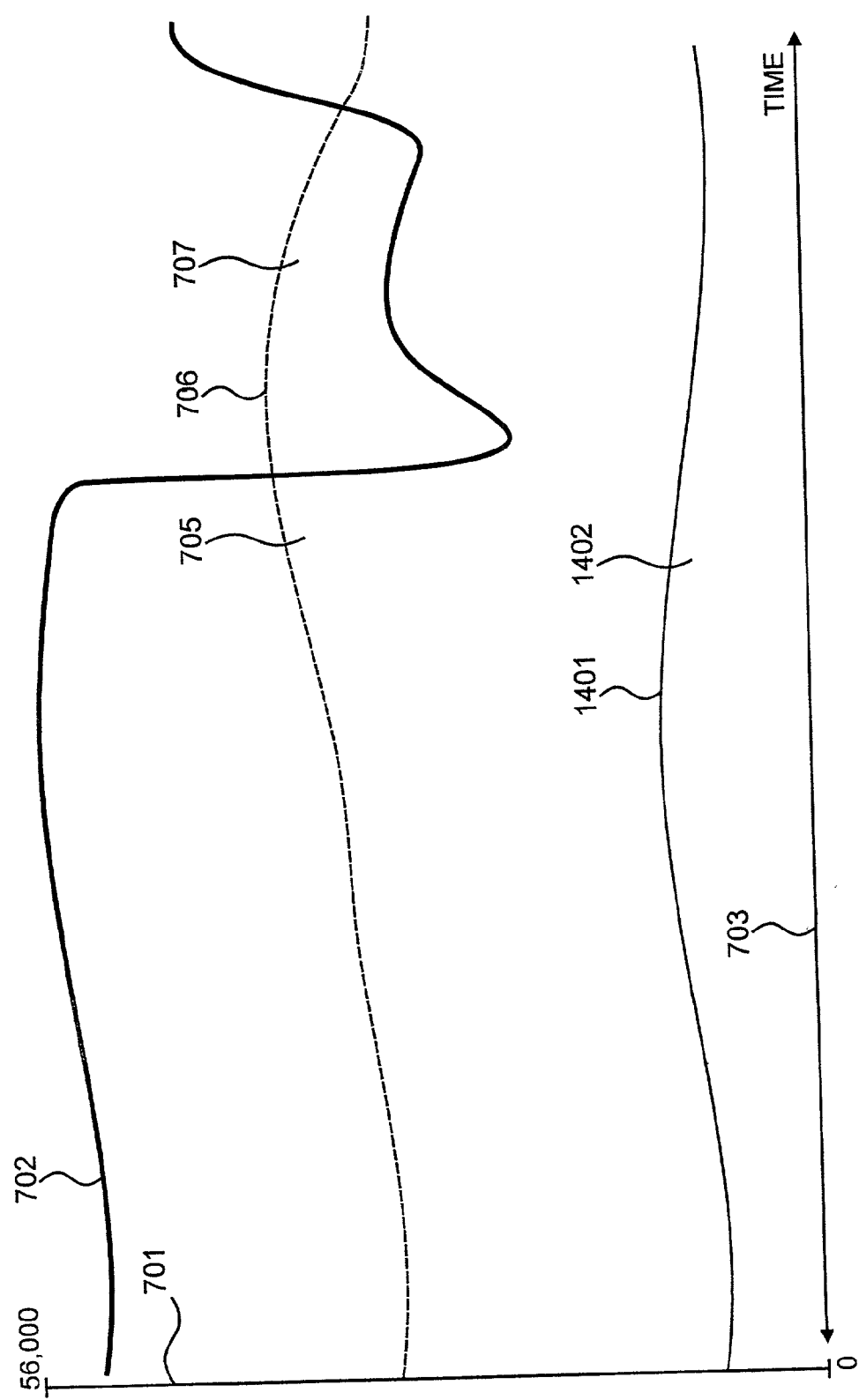
FIG. 14 illustrates the updating information shown in FIG. 7 when PHBDR according to the invention is implemented.
Figure 17:
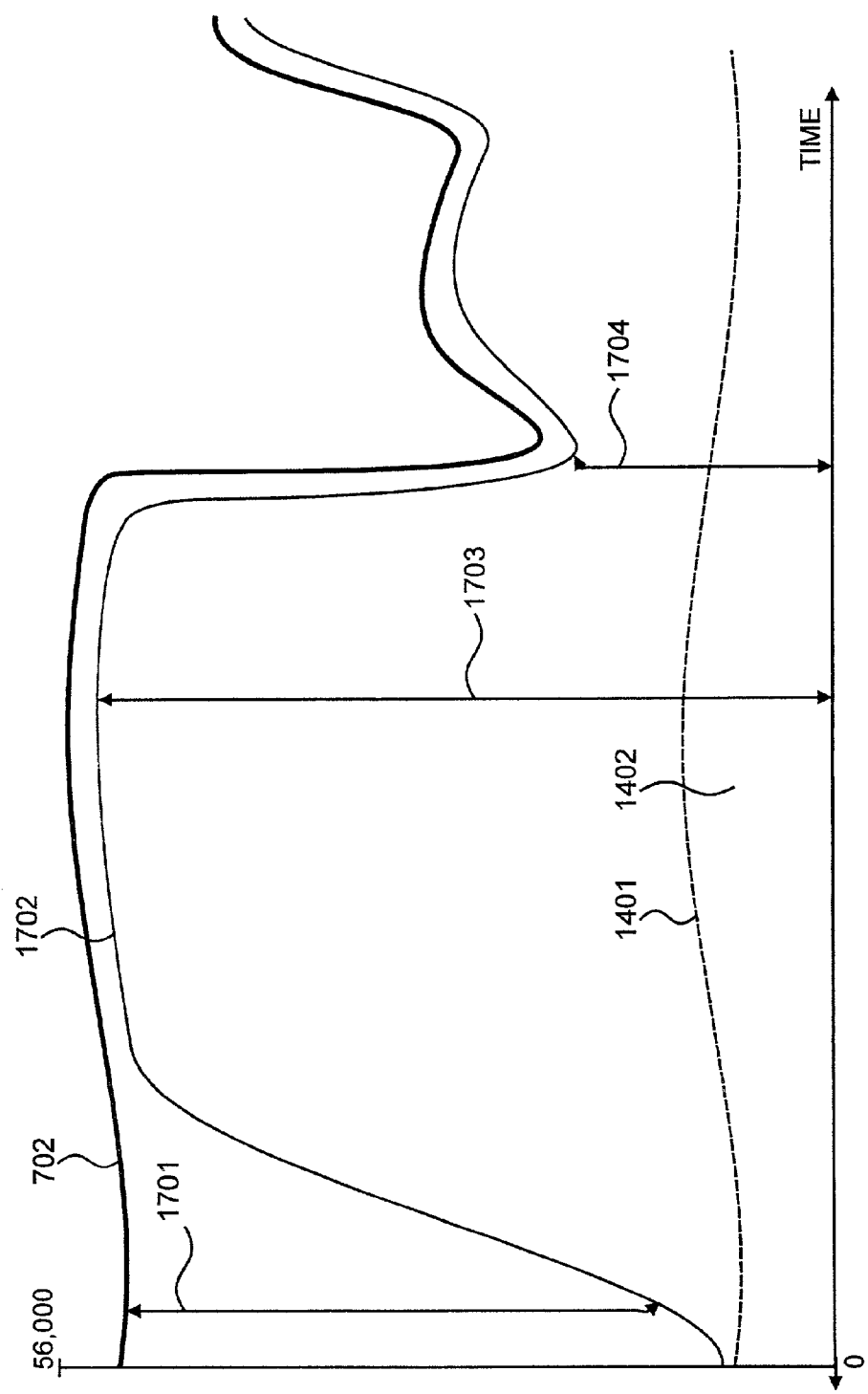
FIG. 17 illustrates the updating information shown in FIG. 14 when PHBDR according to the improved embodiment of the invention is implemented.

The updating information shown in FIG. 14 when PHBDR according to an improved embodiment of the present invention is implemented is graphically detailed in FIG. 17.

FIG. 17

As previously described, the amplitude 701 of the total available network bandwidth ranges between the minimum value of zero bit per second and the maximum value of 56,000 bits per second, the later value corresponding to the typical modem connection speed of a computer terminal connected to the Internet 107. Said maximum value, represented by continuous line 702, fluctuates unpredictably over time, represented by horizontal axis 703. Said fluctuation arises from 'network traffic', and also from key network points logging on and off said network for reasons of maintenance or failure.

It was previously explained that the maximum portion of bandwidth 1401 required to transfer updating data is permanently lower than the portion 706 according to the PHBDR protocol of the present invention, as less updating data is transmitted. As more users take part in simulation application 803 and therefore more duplicas 804 require updating, the amount of bandwidth 1402 used to transmit said mounting number of updates remains minimal at all times.

According to a preferred embodiment of the present invention, however, unused bandwidth 1701 is determined as available at step 1501 and, following the incrementing of quality factor 1601 at step 1502 and error tolerance computation at step 1503, the portion of bandwidth 1401 required to transfer updating data is incrementally maximised to a portion of bandwidth 1702 marginally smaller than the maximum available bandwidth 702, wherein duplicas 804 are more frequently updated and thus rendered as accurately as possible. As said maximum available bandwidth 702 fluctuates over time, the total amount of bandwidth 1703 used by simulation application 803 in order for local duplicate master 805 to update remote duplicas 804 fluctuates in kind. Decreasing bandwidth 702 is eventually determined at step 1501 and, following the inverse incrementing of quality factor 1601 at step 1504 and error tolerance computation at step 1505, the portion of bandwidth required to transfer updating data is incrementally decreased to a portion of bandwidth 1704, wherein duplicas 804 are less frequently updated but still rendered as accurately as possible, as they are no less frequently updated than according to the portion of bandwidth 1401.

The graphical user interface (GUI) of simulation application 803 displayed by the respective Video Display Units of computer terminals 101 and 103 are shown in FIG. 18 according to the preferred embodiment of the present invention.

FIG. 18

VDU 208 of computer terminal 101 displays the GUI 1801 of the computer terminal's operating system 801, within which a windowed GUI 1802 of the local simulation application 803 is also displayed. Within said GUI 1802, a rendered graphical representation 1803 of local aircraft 1001 can be observed, as well as rendered graphical representations 1804 and 1805 of remote aircrafts 1005 and 1006 respectively. Said rendered graphical representation 1803 is displayed from a point of view situated at the back of aircraft 1001, which is the origin of the field of view 1101, as the user of computer terminal 101 must be able to view the three-dimensional computer-generated environment in front of said aircraft in order to correctly decide which actions to impart the aircraft with, for instance in order to 'fly' above a mountain ridge or 'shoot' at the remote aircrafts 1005 and 1006.

Similarly, VDU 208 of computer terminal 103 displays the GUI 1801 of the computer terminal's operating system 801, within which a windowed GUI 1802 of the local simulation application 803 is also displayed. Within said GUI 1802, a rendered graphical representation 1806 of local aircraft 1003 can be observed, as well as rendered graphical representations 1807 and 1808 of remote aircrafts 1005 and 1001 respectively. Said rendered graphical representation 1806 is displayed from a point of view situated at the back of aircraft 1003, as the user of computer terminal 102 must be able to view the three-dimensional computer-generated environment in front of said aircraft in order to correctly decide which actions to impart the aircraft with, for instance in order to 'fly' so as to evade fire from the remote aircraft 1001 or 'shoot' at it.

Throughout the course of the simulation experience, the GUI 1802 at computer terminal 101 refreshes the action displayed to its user based upon the actual three-dimensional position of local object 1001 rendered as aircraft 1803 and the extrapolation of the respective three-dimensional positions of remote shared objects 1005 and 1006, respectively rendered as graphical representations 1804 and 1805. As local object 1001 is the duplicate master 805 of all the aircrafts 1004, i.e. duplicas 804, throughout the network, said duplicate master 805 updates remote aircraft 1004 at computer terminal 102 and remote aircraft 1004 at computer terminal 103 according to the PHBDR protocol of the present invention, such that graphical representation 1807 at computer terminal 102 is accurately rendered within the three-dimensional computer-generated environment, and likewise at computer terminal 103. As it can be observed that the rendered graphical representation 1803 of aircraft 1001 is closer to the graphical representation 1804 of remote aircraft 1005 than it is from the graphical representation 1805 of remote aircraft 1006, said duplicate master 805 updates aircraft 1004 at computer terminal 102 more frequently than it updates aircraft 1004 at computer terminal 103.

Likewise at computer terminal 103, where local object 1003 is the duplicate master 805 of all the aircrafts 1006, i.e. duplicas 804, throughout the network, it can be observed that the rendered graphical representation 1806 of local aircraft 1003 is closer to the graphical representation 1807 of remote aircraft 1005 than it is from the graphical representation 1808 of remote aircraft 1001, said duplicate master 805 updates aircraft 1006 at computer terminal 102 more frequently than it updates aircraft 1006 at computer terminal 101.

The invention claimed is:

1. A computer network having a plurality of terminals each having a processor, a memory, a manual input and a network connection, wherein
    each of said terminals executes instructions to define a shared virtual environment;
    each of said instructions includes a local object defining a local entity, said object including data defining attributes of said entity, wherein said entity is perceived by a user as being controllable within said shared virtual environment in response to manual control that changes said data;
    said local object is duplicated on other network terminals as a duplica;
    each terminal predicts the data of its duplicas;
    each terminal modifies the predicted data of its duplicas in response to receiving updates from the duplicas' originating terminals; and
    each originating terminal sends updates to specific destination terminals in dependence on whether an error exceeds a threshold, wherein:
        said threshold is dependent upon a measurement of relevance between a first entity and a second entity, said first entity being defined by the local object at said originating terminal and said second entity being defined by a local object at the destination terminal, and
    said error is computed by comparing the data of said local object at said originating terminal and the predicted data of the duplica at the destination terminal.

2. A computer network according to claim 1, wherein said measurement of relevance is performed by comparing the data of said local object of said originating terminal and the predicted data of the duplica defining said second entity that is stored on said originating terminal.

3. A computer network according to claim 1, wherein said measurement of relevance is a measurement of distance between the positions of said first and second entities in said shared virtual environment as defined by the data of said objects.

4. A computer network according to claim 1, wherein
    each of said entities is considered to have a visible area of said shared virtual environment based on the attributes of said entity and the layout of said environment, and
    said measurement of relevance is a function of the position of said first entity within said shared virtual environment with respect to the visible area of said second entity.

5. A computer network according to claim 1, wherein said attributes of an entity include the position within said shared virtual environment of said entity.

6. A computer network according to claim 1, wherein said attributes of an entity include the direction and velocity of travel of said entity within said shared virtual environment.

7. A computer network according to claim 1, wherein said attributes of an entity include the state of a weapon of said entity.

8. A computer network according to claim 1, wherein said assessment of update necessity includes a measurement of the available network bandwidth.

9. A method of updating objects defining a virtual environment shared over a computer network, wherein said network includes a plurality of terminals each having a processor, a memory, a manual input and a network connection, comprising the steps of:

at each of said terminals, executing instructions to define a shared virtual environment, wherein each of said instructions includes a local object defining a local entity, said object including data comprising attributes of said entity, and said entity is perceived by a user as being controllable within said shared virtual environment in response to manual control that changes said data;

duplicating each local object on other network terminals as a duplica;

at each of said terminals, predicting the data of said duplicas;

at each of said terminals, modifying the predicted data of said duplicas in response to receiving updates from the duplicas' originating terminals; and at each originating terminal, sending updates to specific destination terminals in dependence on whether an error exceeds a threshold, wherein said assessment includes:

said threshold is dependent upon a measurement of relevance between a first entity and a second entity, said first entity being defined by the local object at said originating terminal and said second entity being defined by a local object at the destination terminal, and said error is computed by comparing the data of said local object at said originating terminal and the predicted data of the duplica at the destination terminal.

10. A method according to claim 9, wherein said measurement of relevance is performed by comparing the data of said local object of said originating terminal and the predicted data of the duplica defining said second entity that is stored on said originating terminal.

11. A method according to claim 9, wherein said measurement of relevance is a measurement of distance between the positions of said first and second entities in said shared virtual environment as defined by the data of said objects.

12. A method according to claim 9, wherein each of said entities is considered to have a visible area of said shared virtual environment based on the attributes of said entity and the layout of said environment, and said measurement of relevance is a function of the position of said first entity within said shared virtual environment with respect to the visible area of said second entity.

13. A method according to claim 9, wherein said attributes of an entity include the position within said shared virtual environment of said entity.

14. A method according to claim 9, wherein said attributes of an entity include the direction and velocity of travel of said entity within said shared virtual environment.

15. A method according to claim 9, wherein said attributes of an entity include the state of a weapon of said entity.

16. A method according to claim 9, wherein said assessment of update necessity includes a measurement of the available network bandwidth.

17. A computer-readable medium having computer-readable instructions executable by a computer such that, when executing said instructions, a computer will perform the steps of executing instructions to define a shared virtual environment, wherein said instructions include a local object defining a local entity and at least one local duplica object each defining a remote entity, said objects including data comprising attributes of said entities, wherein said local entity is perceived by a user as being controllable within said shared virtual environment in response to manual control that changes the data of said local object;

duplicating said local object to other networked terminals as remote duplicas;

predicting the data of said local duplicas;

modifying the predicted data of said local duplicas in response to receiving updates from the duplicas' originating terminals; and sending updates to specific destination terminals in dependence on whether an error exceeds a threshold, wherein said assessment includes:

said threshold is dependent upon a measurement of relevance between a first entity and a second entity, said first entity being defined by the local object at said originating terminal and said second entity being defined by a local object at the destination terminal, and said error is computed by comparing the data of said local object at said originating terminal and the predicted data of the duplica at the destination terminal.

18. A computer-readable medium according to claim 17, wherein said measurement of relevance is performed by comparing the data of said local object of said originating terminal and the predicted data of the duplica defining said second entity that is stored on said originating terminal.

19. A computer-readable medium according to claim 17, wherein said measurement of relevance is a measurement of distance between the positions of said first and second entities in said shared virtual environment as defined by the data of said objects.

20. A computer-readable medium according to claim 17, wherein each of said entities is considered to have a visible area of said shared virtual environment based on the attributes of said entity and the layout of said environment, and said measurement of relevance is a function of the position of said first entity within said shared virtual environment with respect to the visible area of said second entity.

21. A computer-readable medium according to claim 17, wherein said attributes of an entity include the position within said shared virtual environment of said entity.

22. A computer-readable medium according to claim 17, wherein said attributes of an entity include the direction and velocity of travel of said entity within said shared virtual environment.

23. A computer-readable medium according to claim 17, wherein said attributes of an entity include the state of a weapon of said entity.

24. A computer-readable medium according to claim 17, wherein said assessment of update necessity includes a measurement of the available network bandwidth.

* * * * *